US011453290B2

(12) United States Patent
Ing

(10) Patent No.: US 11,453,290 B2
(45) Date of Patent: Sep. 27, 2022

(54) FAULTY POWER SOURCE EJECTION IN A SAFE ZONE

(71) Applicant: NIO Technology (Anhui) Co., Ltd., Hefei (CN)

(72) Inventor: Adam H. Ing, San Francisco, CA (US)

(73) Assignee: NIO Technology (Anhui) Co., Ltd., Heifei (CN)

( * ) Notice: Subject to any disclaimer, the term of this patent is extended or adjusted under 35 U.S.C. 154(b) by 311 days.

(21) Appl. No.: 16/777,054

(22) Filed: Jan. 30, 2020

(65) Prior Publication Data

US 2021/0237578 A1    Aug. 5, 2021

(51) Int. Cl.
*B60L 3/00* (2019.01)
*B60W 20/50* (2016.01)
*B60L 58/13* (2019.01)

(52) U.S. Cl.
CPC ........... *B60L 3/0046* (2013.01); *B60L 3/0053* (2013.01); *B60L 3/0069* (2013.01); *B60W 20/50* (2013.01); *B60L 58/13* (2019.02)

(58) Field of Classification Search
CPC ........ Y02T 10/72; Y02T 90/14; B60W 20/50; B60W 2510/244; B60W 2710/18; B60W 2554/00; B60W 2710/20; B60W 2420/42; B60W 2720/106; B60L 2250/10; B60L 2240/622; B60L 3/0023; B60L 2260/32; B60L 53/16; G05D 1/0055; G05D 2201/0213; B60Y 2306/13
See application file for complete search history.

(56) References Cited

U.S. PATENT DOCUMENTS

| 6,633,800 | B1 | 10/2003 | Ward et al. |
| 7,388,349 | B2 | 6/2008 | Elder et al. |
| 8,634,980 | B1 | 1/2014 | Urmson et al. |

(Continued)

FOREIGN PATENT DOCUMENTS

KR    100610845    8/2006

OTHER PUBLICATIONS

Official Action for U.S. Appl. No. 15/407,066, dated Nov. 8, 2018, 9 pages.

(Continued)

*Primary Examiner* — Jared Fureman
*Assistant Examiner* — Duc M Pham
(74) *Attorney, Agent, or Firm* — Sheridan Ross P.C.

(57) ABSTRACT

Methods, systems, and devices of an electrical vehicle are provided that recognize a catastrophic power system fault with one or more drive power sources of the vehicle and in response driving to an identified safe ejection location, ejecting the faulty drive power sources, and driving to a safe parked location or outside a predetermined safe range. Upon reaching the safe ejection location, the driver or vehicle can evaluate the location using imaging sensors to determine whether the location is free of objects, animals, or people. If not, the vehicle may autonomously drive or be driven to another safe ejection location. After detecting and prior to ejecting the faulty drive power sources, the vehicle may send warning messages, including information about the power system fault, to at least one device or third party. After ejection, the vehicle may be driven to a safe parked location or outside a predetermined safe range.

20 Claims, 22 Drawing Sheets

(56) References Cited

U.S. PATENT DOCUMENTS

| | | |
|---|---|---|
| 8,698,639 B2 | 4/2014 | Fung et al. |
| 8,872,474 B2 | 10/2014 | Scheucher |
| 9,663,118 B1* | 5/2017 | Palmer ................. G05D 1/0061 |
| 9,969,404 B2 | 5/2018 | McNew |
| 10,471,829 B2* | 11/2019 | Yellambalase ....... G05D 1/0055 |
| 10,682,920 B2 | 6/2020 | Smith |
| 2011/0190972 A1 | 8/2011 | Timmons et al. |
| 2012/0083947 A1 | 4/2012 | Anderson et al. |
| 2013/0015814 A1 | 1/2013 | Kelty et al. |
| 2013/0297195 A1 | 11/2013 | Das et al. |
| 2014/0021915 A1 | 1/2014 | Staley et al. |
| 2014/0244096 A1 | 8/2014 | An et al. |
| 2014/0309864 A1 | 10/2014 | Ricci |
| 2015/0343918 A1 | 12/2015 | Watanabe et al. |
| 2016/0009291 A1 | 1/2016 | Pallett et al. |
| 2016/0009295 A1 | 1/2016 | Chun et al. |
| 2016/0009391 A1 | 1/2016 | Friesel |
| 2016/0129908 A1 | 5/2016 | Harda |
| 2016/0276854 A1* | 9/2016 | Lian .......................... B60L 3/12 |
| 2017/0036673 A1 | 2/2017 | Lee |
| 2017/0057507 A1* | 3/2017 | Gordon ................. B60W 30/16 |
| 2018/0052463 A1 | 2/2018 | Mays |
| 2018/0118219 A1 | 5/2018 | Hiei et al. |
| 2019/0061462 A1* | 2/2019 | Smith .................... B60L 58/26 |

OTHER PUBLICATIONS

Official Action for U.S. Appl. No. 15/407,066, dated Mar. 12, 2019, 11 pages.

Notice of Allowance for U.S. Appl. No. 15/407,066, dated Jul. 3, 2019, 5 pages.

Supplemental Notice of Allowance for U.S. Appl. No. 15/407,066, dated Sep. 10, 2019, 2 pages.

* cited by examiner

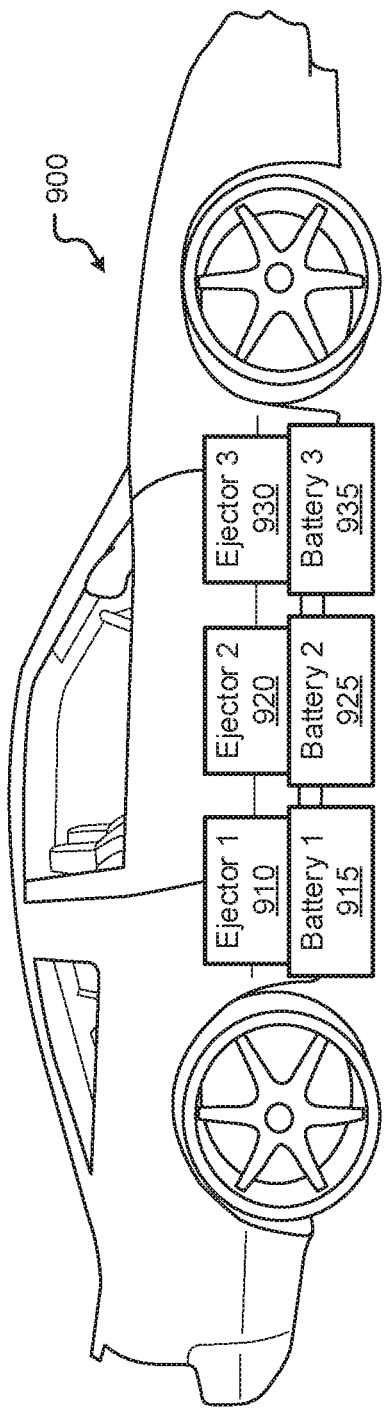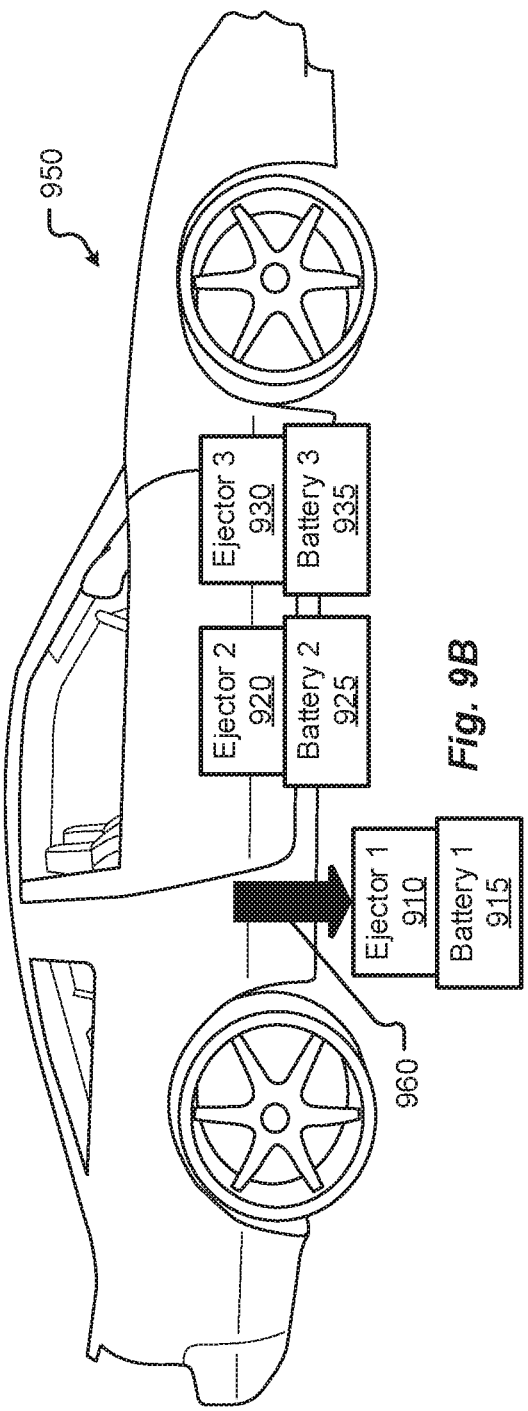

FAULTY POWER SOURCE EJECTION IN A SAFE ZONE

FIELD

The present disclosure is generally directed to vehicle systems, in particular, toward ejecting faulty drive power sources.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new, they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure to improve safety.

BRIEF DESCRIPTION OF THE DRAWINGS

FIG. 9A illustrates an example vehicle with three ejectable drive power sources in accordance with embodiments of the present disclosure;

FIG. 9B illustrates an example vehicle that has an ejected drive power source and two remaining drive power sources in accordance with embodiments of the present disclosure;

DETAILED DESCRIPTION

Embodiments of the present disclosure will be described in connection with a vehicle, and in some embodiments, an electric vehicle, rechargeable electric vehicle, and/or hybrid-electric vehicle and associated systems.

In some embodiments, the vehicle comprises a plurality of on-board power sources, such as battery packs, that power the vehicle drivetrain. In the event of a problem with the power source, the power sources can be disconnected and ejected by a suitable mechanism to avoid endangering the vehicle or its occupants and cargo. For example, an electric or hybrid vehicle may have a plurality of battery packs electrically connected in parallel relative to a load, such as the drive train. In the event of thermal runaway of one or more cells or other damage to the battery pack, the affected battery pack can be disconnected, such as by a software executable disconnection logic, and ejected from the vehicle. The rebalanced battery packs remaining in the vehicle can enable the vehicle to drive away from the ejected battery pack, thereby preventing further damage to the vehicle or its contents or injury to its occupants while maintaining vehicle operation. The ejection mechanism can be any suitable mechanism, such as a pyrotechnic, a loaded spring, or robotic actuator. While the disclosure is directed to a vehicle, such as a truck, car, or other powered wheeled or tracked vehicle, the concepts of the disclosure can apply to other types of vehicles, such as ships, boats, aircraft, and the like.

Figure 1:
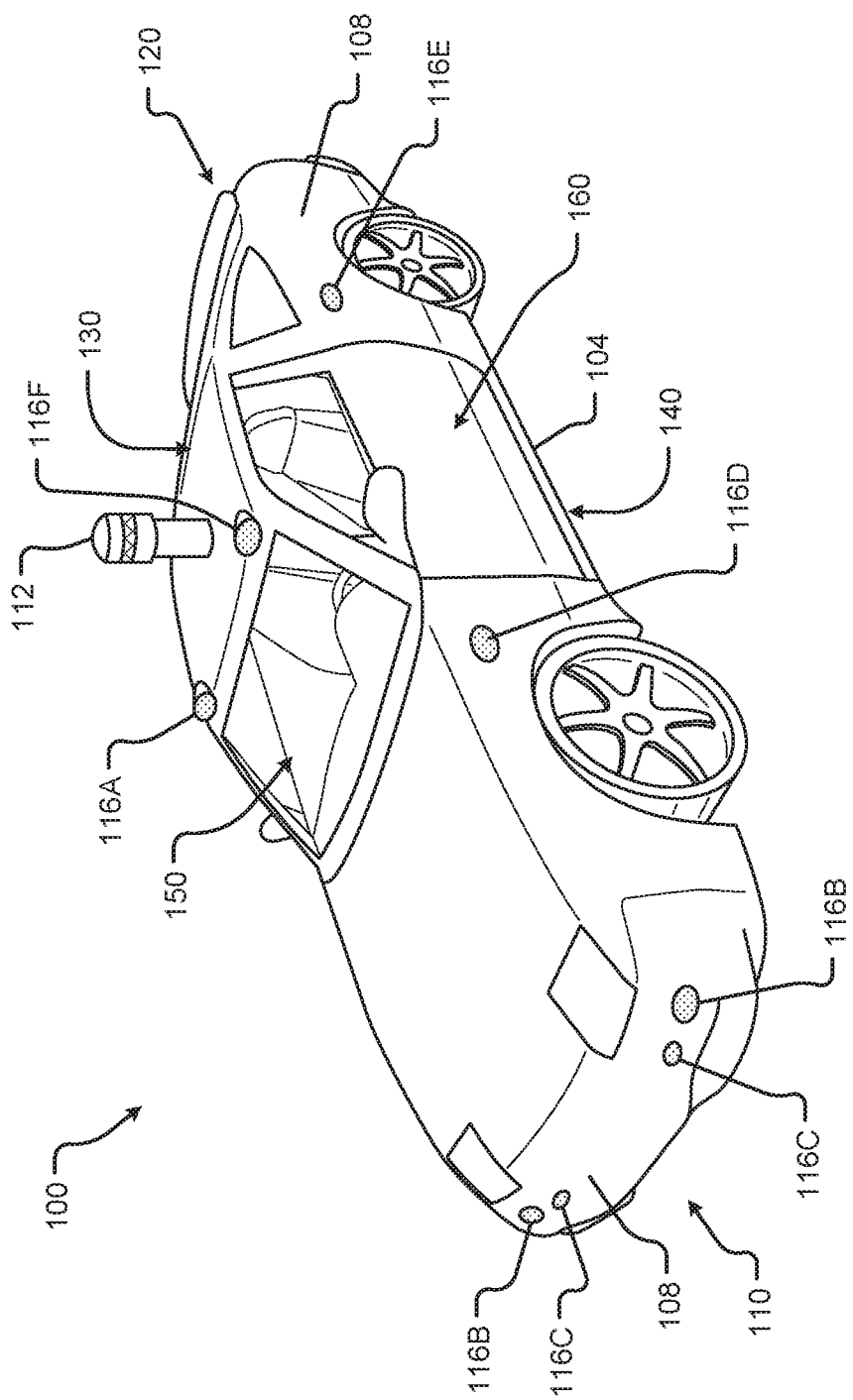
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally, or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2A:
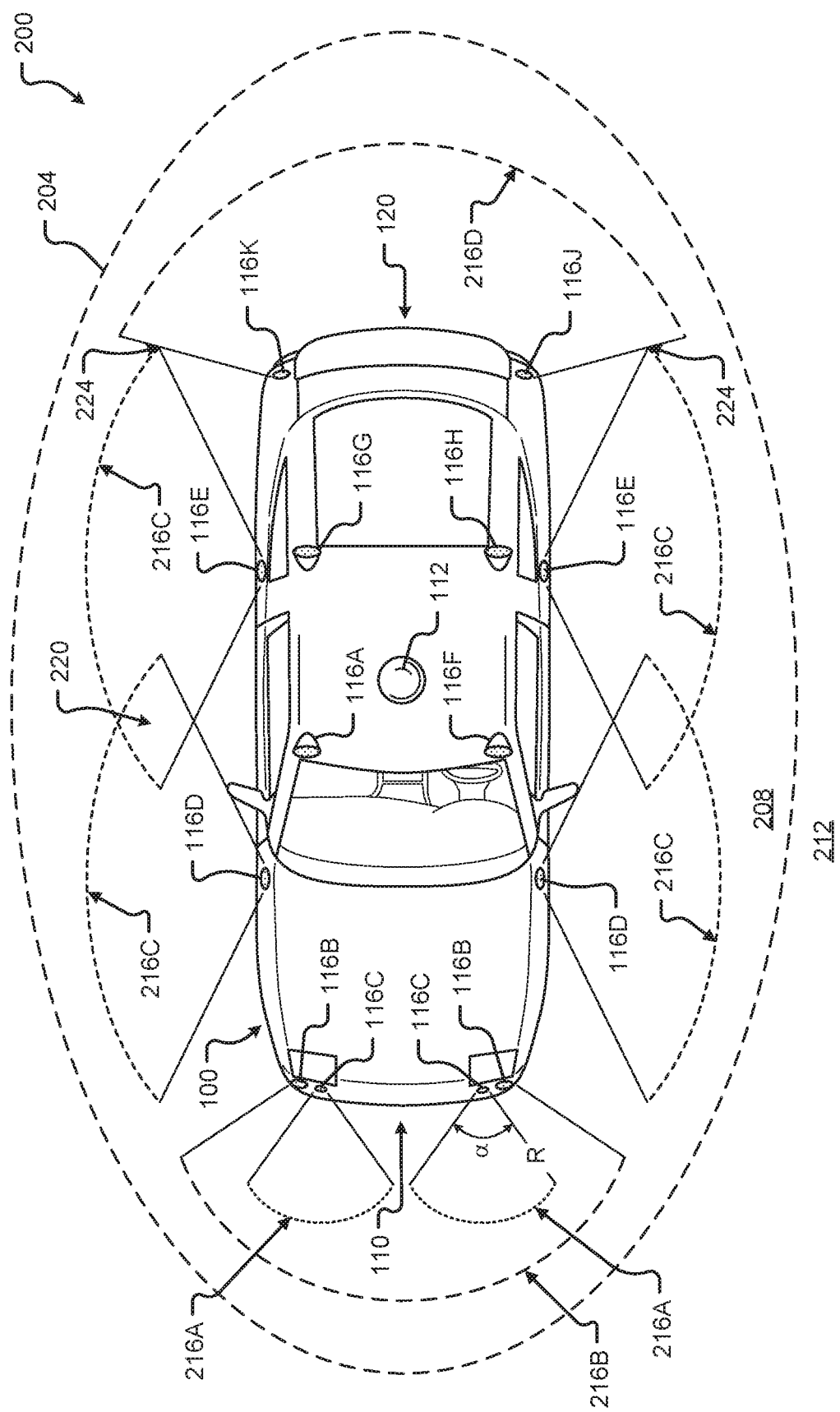
FIG. 2A shows a plan view of the vehicle in accordance with at least some embodiments of the present disclosure.

Referring now to FIG. 2A, a plan view of a vehicle 100 will be described in accordance with embodiments of the present disclosure. In particular, FIG. 2A shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally, or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally, or alternatively, the sensors 116A-K may detect a target that is both, or simultaneously, at a side 160 and a rear 120 of the vehicle 100 (e.g., disposed at a diagonal angle to the centerline of the vehicle 100).

Figure 2B:
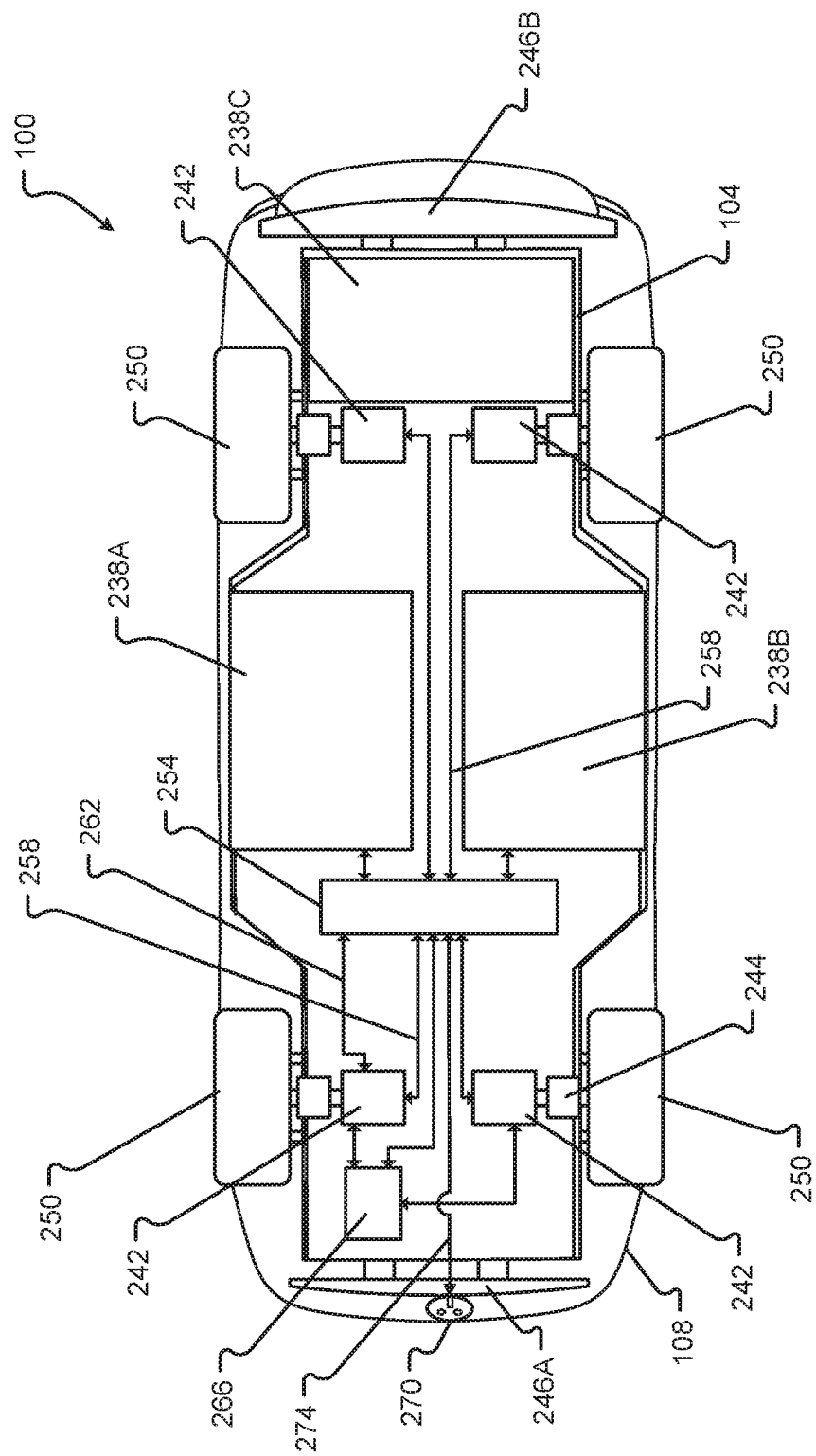
FIG. 2B shows a plan view of the vehicle in accordance with at least some embodiments of the present disclosure.

Referring now to FIG. 2B, a plan view of a vehicle 100 will be described in accordance with at least some embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 238A, 238B, 238C, motors 242, engines, safety equipment, controllers, user interfaces, interiors exterior components, body panels 108, bumpers 246, sensors, etc., and/or combinations thereof. Additionally, or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange (SME) principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 238A, 238B, 238C (e.g., battery unit, capacitor unit, etc.) from the vehicle 100 and replace the used power source 238A, 238B, 238C with a charged or new power source. Continuing this example, the power source 238A, 238B, 238C may include selectively interchangeable features that interconnect with the frame 104 or other portion of the vehicle 100. For instance, in a power source 238A, 238B, 238C replacement, the quick release features may be configured to release the power source 238A, 238B, 238C from an engaged position and slide or move in a direction away from the frame 104 of a vehicle 100. Once removed, or separated from, the vehicle, the power source 238A, 238B, 238C may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 242 of the vehicle 100. The electric motors 242 are configured to convert electrical energy provided by a power source into mechanical energy. This mechanical energy may be in the form of a rotational or other output force that is configured to propel or otherwise provide a motive force for the vehicle 100.

Figure 3A:
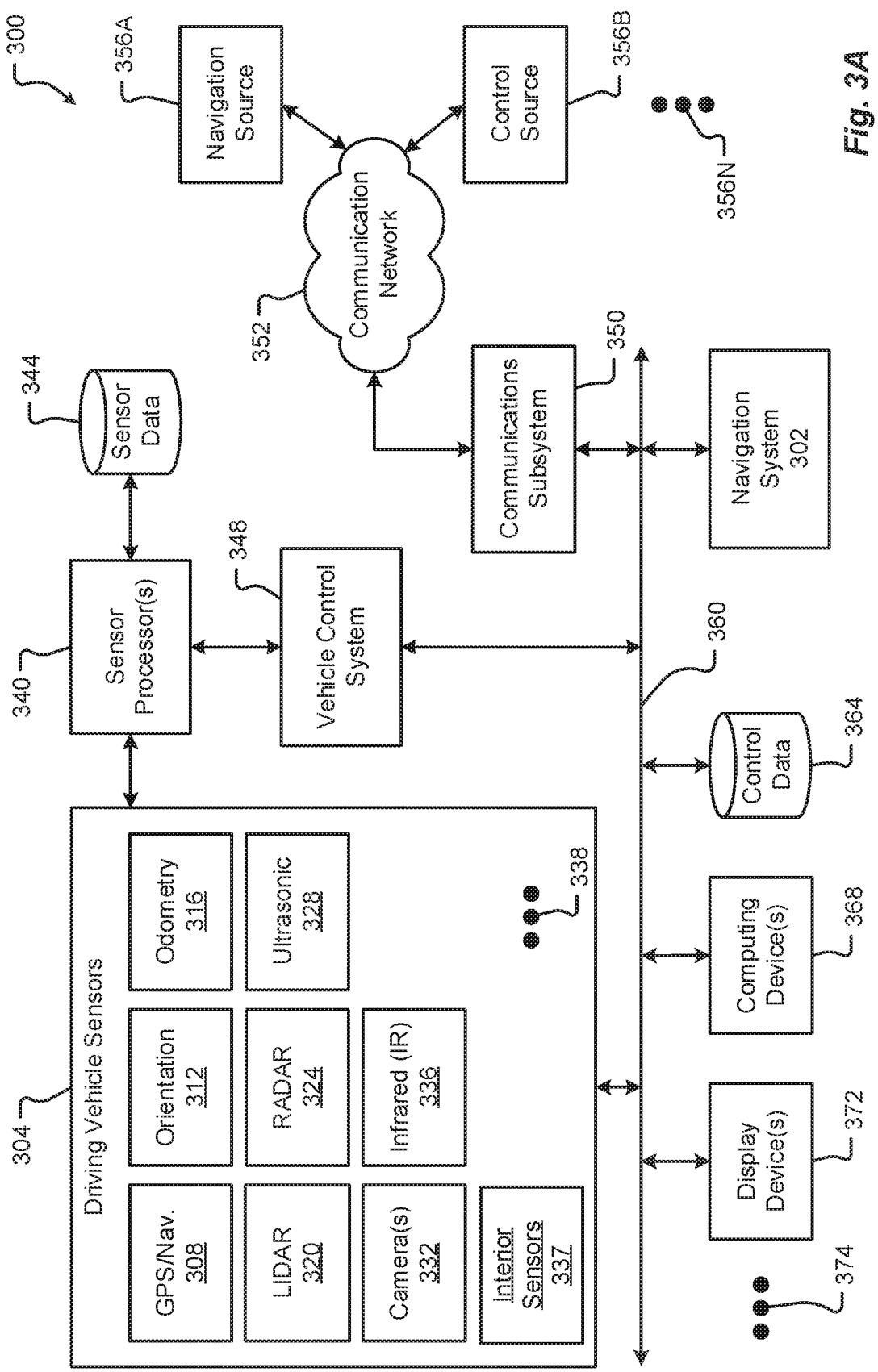
FIG. 3A is a block diagram of an embodiment of a communication environment of the vehicle in accordance with embodiments of the present disclosure.

In some embodiments, the vehicle 100 may include one or more drive wheels 250 that are driven by the one or more electric motors 242 and motor controllers 244. In some cases, the vehicle 100 may include an electric motor 242 configured to provide a driving force for each drive wheel 250. In other cases, a single electric motor 242 may be configured to share an output force between two or more drive wheels 250 via one or more power transmission components. It is an aspect of the present disclosure that the powertrain may include one or more power transmission components, motor controllers 244, and/or power controllers that can provide a controlled output of power to one or more of the drive wheels 250 of the vehicle 100. The power transmission components, power controllers, or motor controllers 244 may be controlled by at least one other vehicle controller, vehicle control system 348, as shown in FIG. 3A, or computer system as described herein.

As provided above, the powertrain of the vehicle 100 may include one or more power sources 238A, 238B, 238C. These one or more power sources 238A, 238B, 238C may be configured to provide drive power, system and/or subsystem power, accessory power, etc. While described herein as a single power source 238 for sake of clarity, embodiments of the present disclosure are not so limited. For example, it should be appreciated that independent, different, or separate power sources 238A, 238B, 238C may provide power to various systems of the vehicle 100. For instance, a drive power source may be configured to provide the power for the one or more electric motors 242 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 238A, 238B, 238C in this manner may provide a number of benefits over conventional vehicle systems. For example, separating the power sources 238A, 238B, 238C allow one power source 238 to be removed and/or replaced independently without requiring that power be removed from all systems and/or subsystems of the vehicle 100 during a power source 238 removal/replacement. For instance, one or more of the accessories, communications, safety equipment, and/or backup power systems, etc., may be maintained even when a particular power source 238A, 238B, 238C is depleted, removed, or becomes otherwise inoperable.

In some embodiments, the drive power source may be separated into two or more cells, units, sources, and/or systems. By way of example, a vehicle 100 may include a first drive power source 238A, a second drive power source 238B, and a third drive power source 238C. Each drive power source 238A, 238B, 238C may be operated independently from or in conjunction with the other drive power sources. Continuing this example, the first drive power source 238A may be removed from a vehicle while a second drive power source 238B and a third drive power source 238C can be maintained in the vehicle 100 to provide drive power. This approach allows the vehicle 100 to significantly reduce weight (e.g., of the first drive power source 238A, etc.) and improve power consumption, even if only for a temporary period of time. In some cases, a vehicle 100 running low on power may automatically determine that pulling over to a rest area, emergency lane, and removing, or "dropping off," at least one power source 238A, 238B, 238C may reduce enough weight of the vehicle 100 to allow the vehicle 100 to navigate to the closest power source replacement and/or charging area. In some embodiments, the removed, or "dropped off," power source 238 may be collected by a collection service, vehicle mechanic, tow truck, or even another vehicle or individual.

Additionally, or alternatively, one or more drive power sources 238A, 238B, 238C may be ejected after one or more sensors detect a catastrophic failure that may cause damage to the vehicle 100, damage to objects or pedestrians near the vehicle 100, and/or passengers within the vehicle 100. In some cases, when a catastrophic failure is detected, the vehicle 100 may automatically determine that pulling over to a rest area or emergency lane, and ejecting at least one power source 238A, 238B, 238C may be necessary. A driver, one or more passengers, or a third party may receive a warning of the catastrophic failure and be given the opportunity to determine when and where the ejection will occur. In some embodiments, the ejected power source 238 may be collected by a collection service, emergency entity, vehicle mechanic, tow truck, or even another vehicle or individual.

The power source 238 may include a GPS or other geographical location system that may be configured to emit a location signal to one or more receiving entities. For instance, the signal may be broadcast or targeted to a specific receiving party. Additionally, or alternatively, the power source 238 may include a unique identifier that may be used to associate the power source 238 with a particular vehicle 100 or vehicle user. This unique identifier may allow an efficient recovery of the power source 238 dropped off or ejected. In some embodiments, the unique identifier may provide information for the particular vehicle 100 or vehicle user to be billed or charged with a cost of recovery for the power source 238.

The power source 238 may include a charge controller 254 that may be configured to determine charge levels of the power source 238, control a rate at which charge is drawn from the power source 238, control a rate at which charge is added to the power source 238, and/or monitor a health of the power source 238 (e.g., one or more cells, portions, etc.). In some embodiments, the charge controller 254 or the power source 238 may include a communication interface. The communication interface can allow the charge controller 254 to report a state of the power source 238 to one or more other controllers of the vehicle 100 or even communicate with a communication device separate and/or apart from the vehicle 100. Additionally, or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 238 to one or more electric motors 242 in the vehicle 100. The power distribution system may include electrical interconnections 258 in the form of cables, wires, traces, wireless power transmission systems, etc., and/or combinations thereof. It is an aspect of the present disclosure that the vehicle 100 include one or more redundant electrical interconnections 262 of the power distribution system. The redundant electrical interconnections 262 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 262 is being used and/or damage has occurred to a particular area of the vehicle electrical system. In any event, the one or more redundant electrical interconnections 262 may be configured along completely different routes than the electrical interconnections 258 and/or include different modes of failure than the electrical interconnections 258 to, among other things, prevent a total interruption power distribution in the event of a failure.

In some embodiments, the power distribution system may include an energy recovery system 266. This energy recovery system 266, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 266, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 248. For example, the recovered electrical energy may be used to charge the power source 238 of the vehicle 100.

The vehicle 100 may include one or more safety systems. Vehicle safety systems can include a variety of mechanical and/or electrical components including, but in no way limited to, low impact or energy-absorbing bumpers 246A, 246B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

The vehicle 100 may include at least one plug or receptacle 270 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 270 may be transferred via at least one power transmission interconnection 274. Similar, if not identical, to the electrical interconnections 858 described above, the at least one power transmission interconnection 274 may be one or more cables, wires, traces, wireless power transmission systems, etc., and/or combinations thereof. Electrical energy in the form of charge can be transferred from the external power source to the charge controller 254. As provided above, the charge controller 254 may regulate the addition of charge to at least one power source 238 of the vehicle 100 (e.g., until the at least one power source 238 is full or at a capacity, etc.).

Figure 3B:
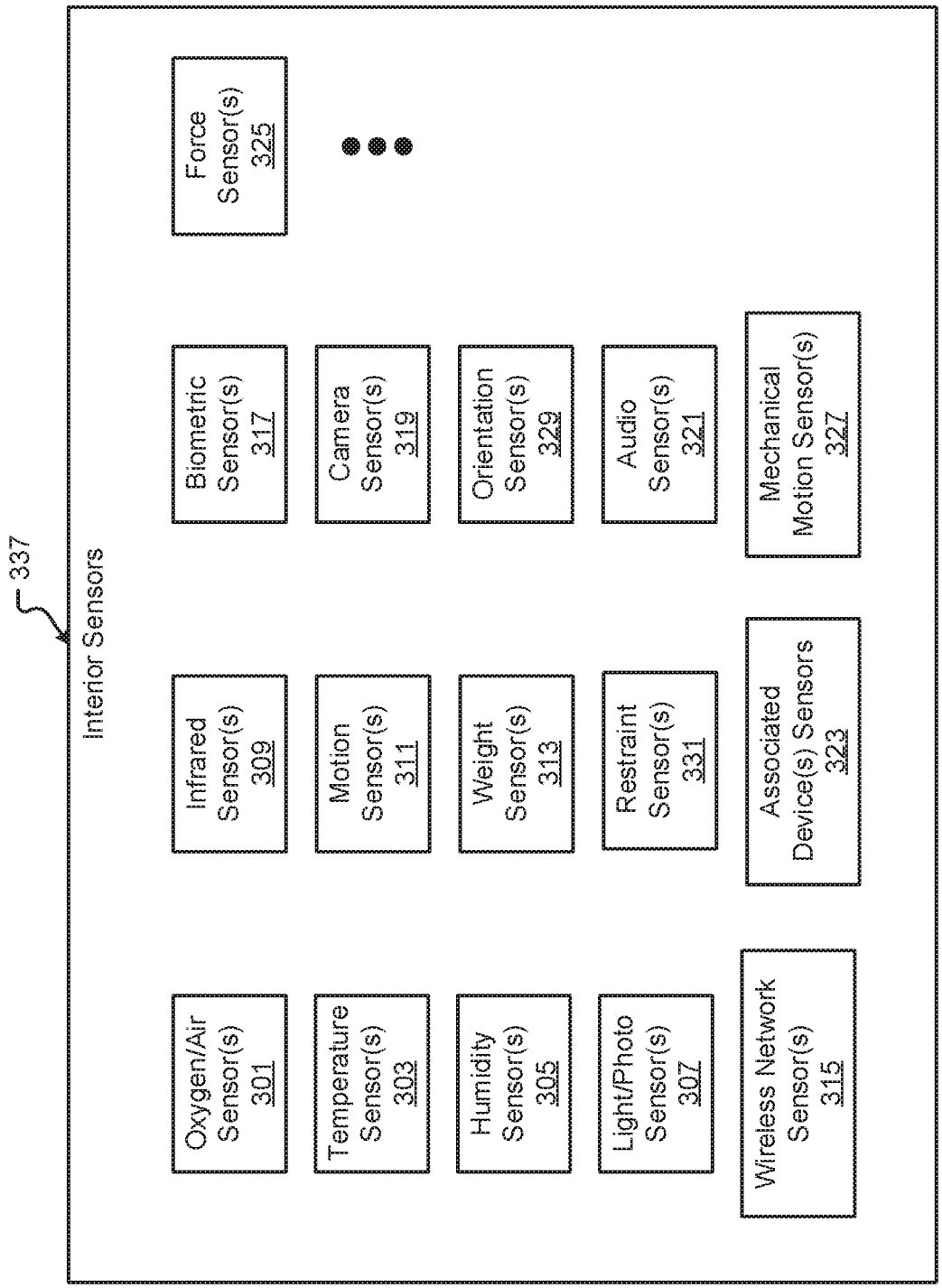
FIG. 3B is a block diagram of an embodiment of interior sensors for a vehicle in accordance with embodiments of the present disclosure.
Figure 3C:
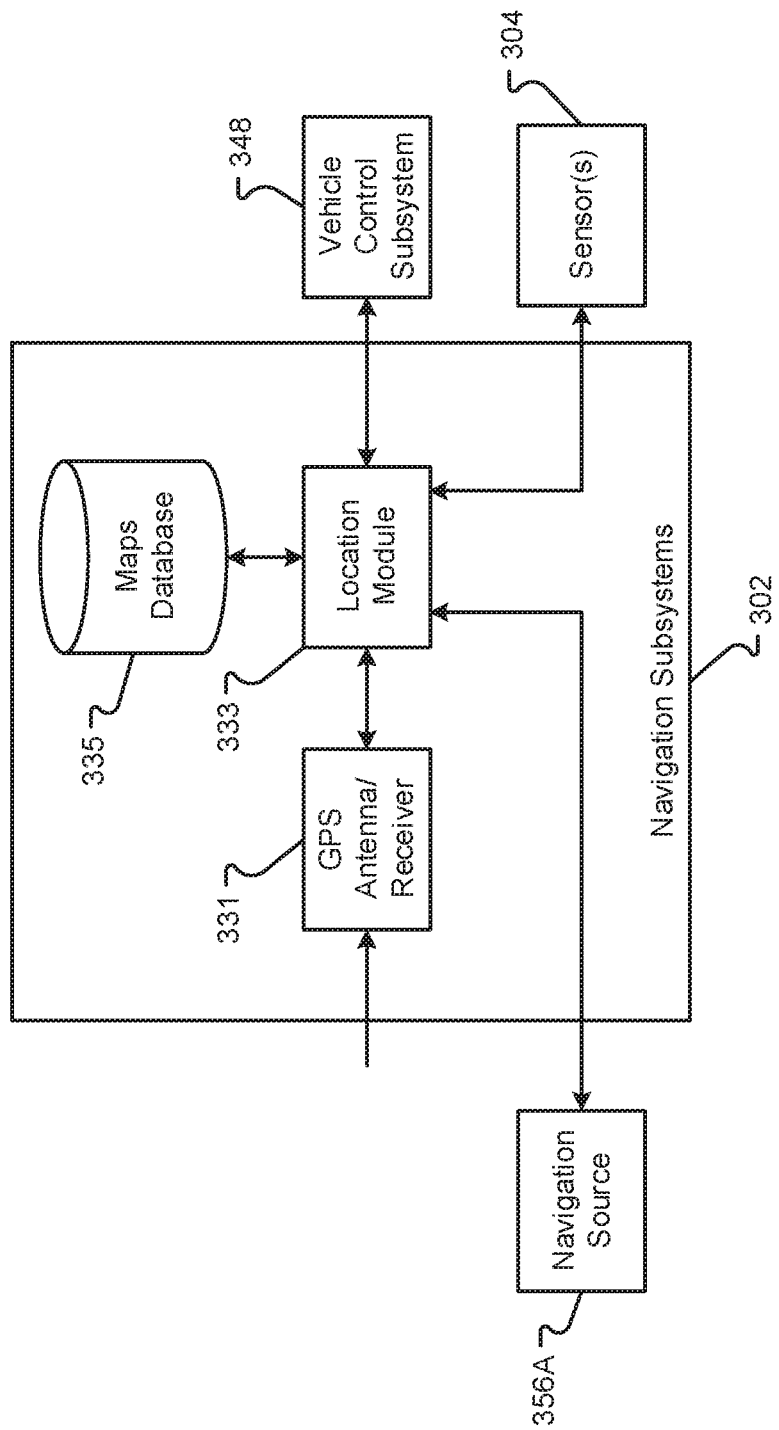
FIG. 3C is a block diagram of an embodiment of a navigation system of a vehicle in accordance with embodiments of the present disclosure.

FIGS. 3A-3C are block diagrams of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS); an Integrated Services Digital Network (ISDN); a Public Switched Telephone Network (PSTN); a Local Area Network (LAN); such as an Ethernet network, a Token-Ring network and/or the like; a Wide Area Network (WAN); a virtual network, including without limitation a virtual private network (VPN); the Internet; an intranet; an extranet; a cellular network; an infra-red network; a wireless network (e.g., a network operating under any of the IEEE 802.9 suite of protocols, the Bluetooth® protocol known in the art, and/or any other wireless protocol); a Controller Area Network (CAN bus); and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally, or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100. The interior sensors 337 may be as described in conjunction with FIG. 3B.

A navigation system 302 can include any hardware and/or software used to navigate the vehicle either manually or autonomously. The navigation system 302 may be as described in conjunction with FIG. 3C.

In some embodiments, the driving vehicle sensors and systems 304 may include other sensors 338 and/or combinations of the sensors 306-337 described above. Additionally, or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory (RAM) and/or a read-only memory (ROM), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory (RAM) and/or a read-only memory (ROM), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, user interface sensor(s), and/or safety sensors. Additionally, or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users 216, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users 216 in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other object in the vehicle 100. Among other things, the Infrared sensors 309 may be used to measure temperatures, form images (especially in low light conditions), identify users 216, and even detect motion in the vehicle 100.

The motion sensors 311 may detect motion and/or movement of objects inside the vehicle 104. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, a first audio sensors 321 may be located in a first area of the vehicle 100 and a second audio sensors 321 may be located in a second area of the vehicle 100. If a sound is detected at a first volume level by the first audio sensors 321 A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally, or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

Figure 4:
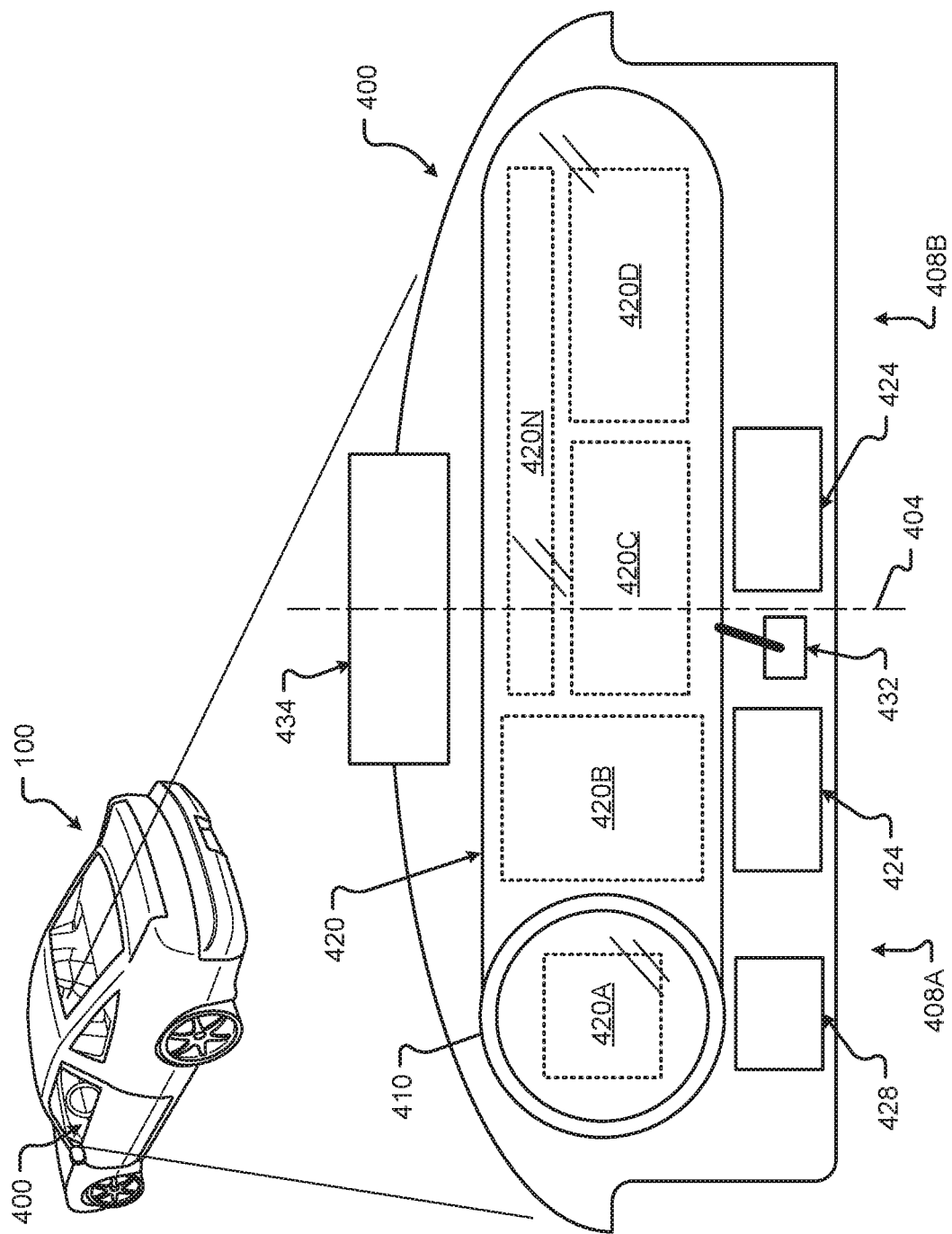
FIG. 4 shows an embodiment of the instrument panel of a vehicle according to one embodiment of the present disclosure.

FIG. 4 shows one embodiment of the instrument panel 400 of a vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally, or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally, or alternatively, the number of portions 420A-N used to visually present information via the operational display 420 may be dynamically increased or decreased as required, and are not limited to the configurations shown.

Figure 5:
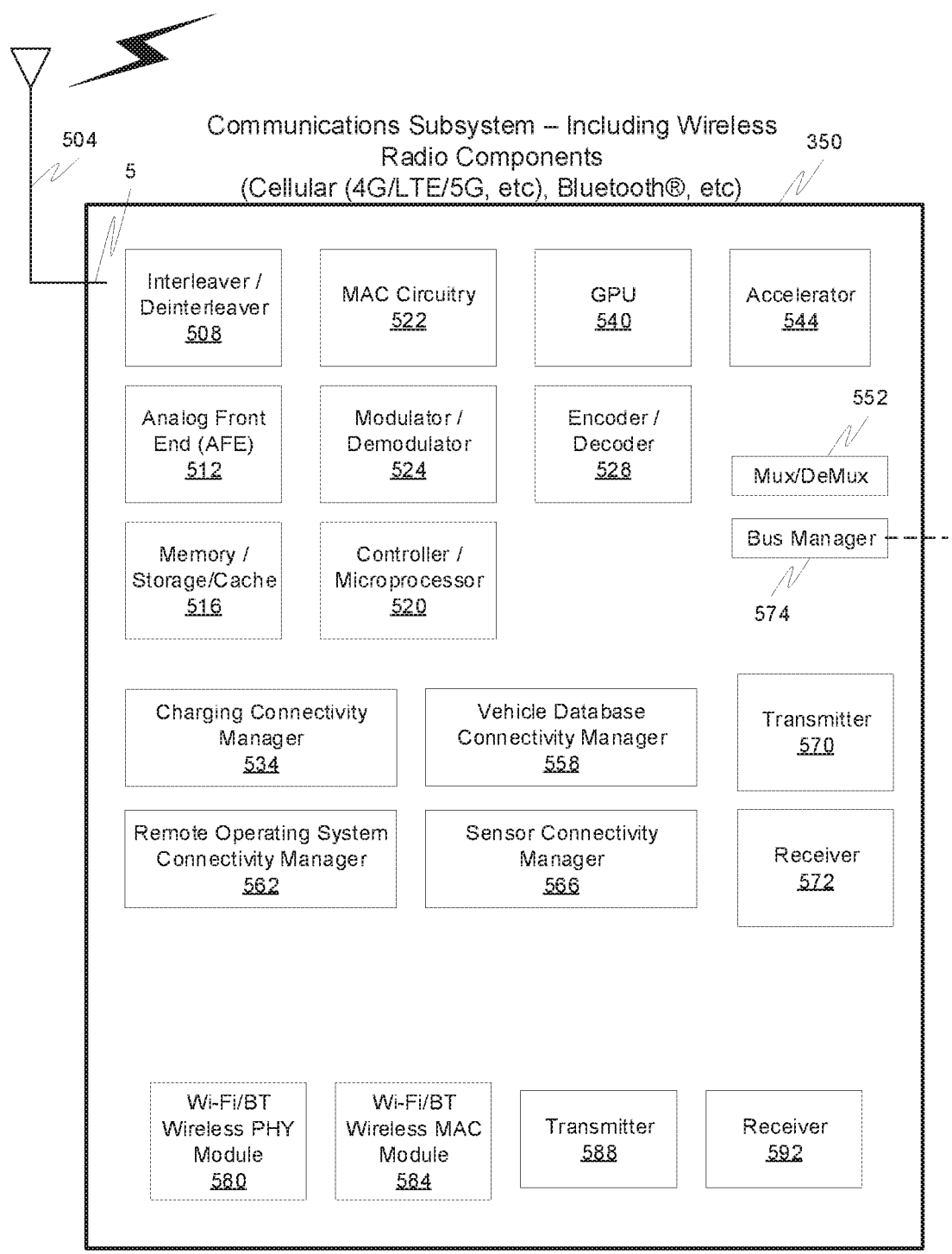
FIG. 5 is a block diagram of an embodiment of a communications subsystem of a vehicle.

FIG. 5 illustrates a hardware diagram of communications componentry that can be optionally associated with a vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CAN FD, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), Ethernet bus, and the like or in general any communications protocol and/or standard(s).

The various protocols and communications can be communicated via one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2/WPA-3 (optionally+AES and/or TKIP) security access keys, network keys, etc. The WPA security access key is a security password used by Wi-Fi networks. Knowledge of this code can enable a wireless device to exchange information with an access point and/or another device. The information exchange can occur through encoded messages with the WPA access code often being chosen by the network administrator.

In some embodiments, the communications subsystem 350 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
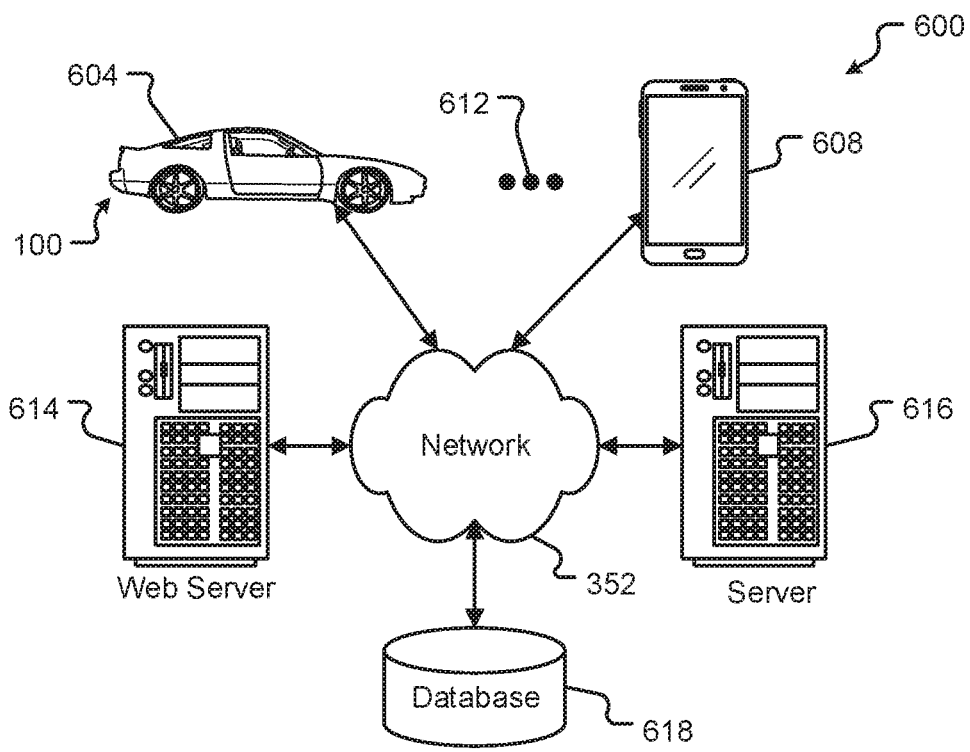
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network (SAN) familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
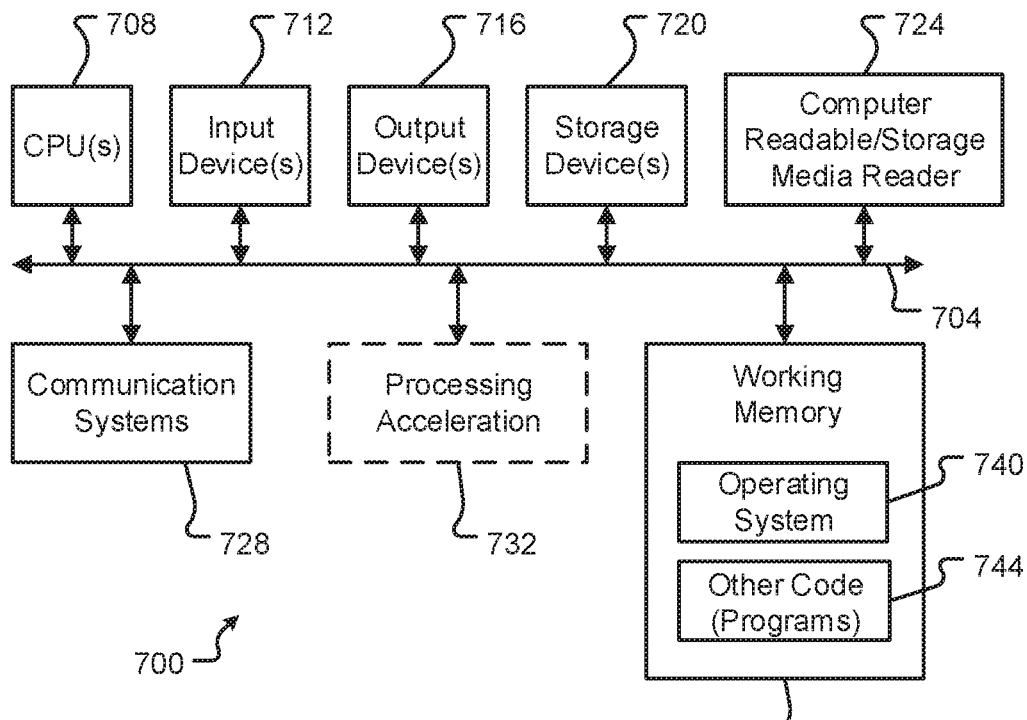
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory (RAM) and/or a read-only memory (ROM), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 8:
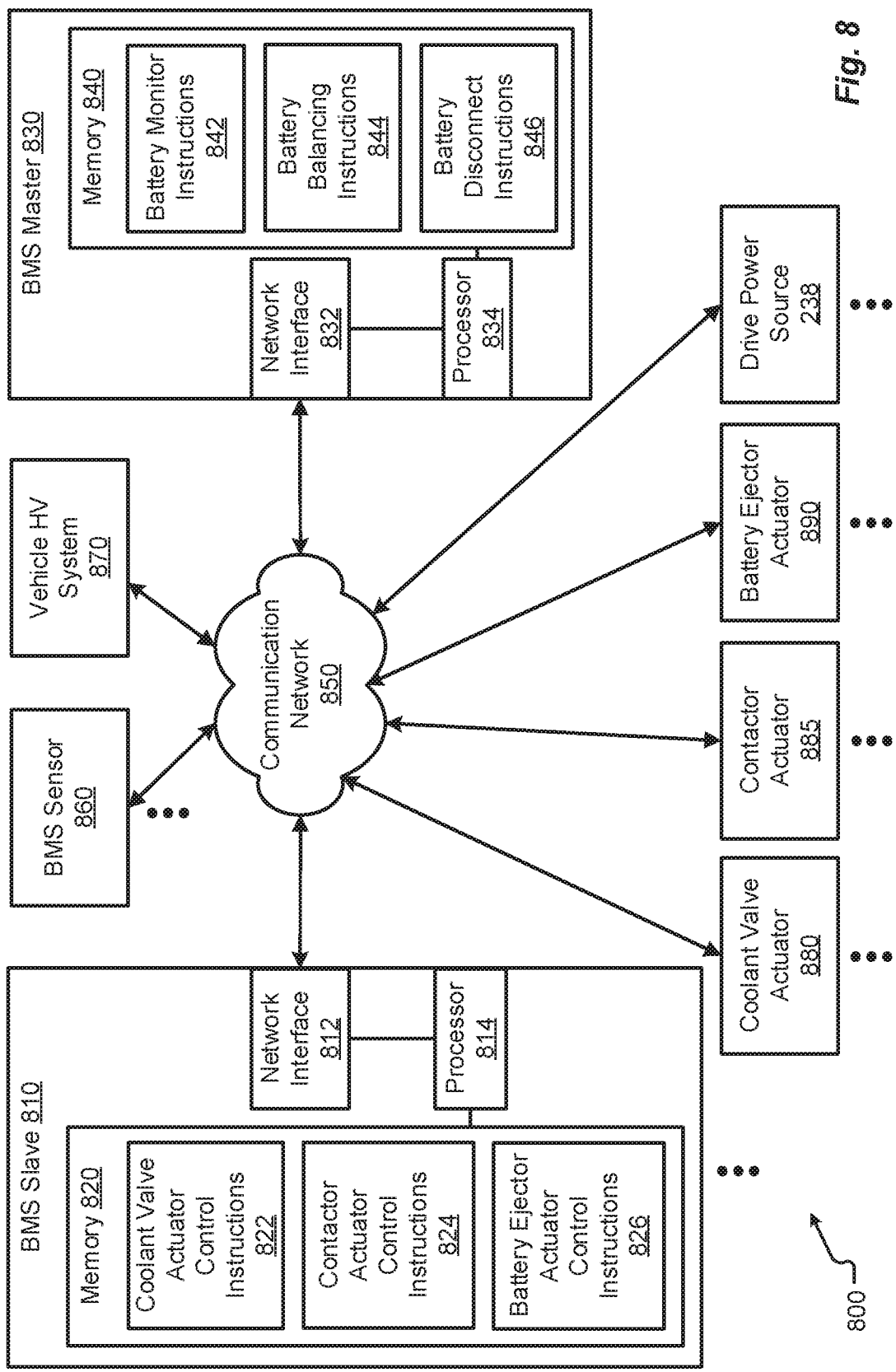
FIG. 8 is a block diagram of a high voltage system associated with the embodiments presented herein.

Referring now to FIG. 8, a block diagram of a high voltage system 800 associated with the embodiments presented herein will be described. As provided below, the vehicle 900 may comprise a number of electrical and/or mechanical systems, subsystems, etc. The electrical and/or mechanical systems of the vehicle 900 can include structural, power, safety, and communications subsystems, to name a few. While each subsystem may be described separately, it should be appreciated that the components of a particular subsystem may be shared between one or more other subsystems of the vehicle 900.

The subsystems of the high voltage system 800 include one or more battery management system (BMS) slaves 810, a BMS master 830, a communication network 850, one or more BMS sensors 860, a vehicle high voltage (HV) system 870, one or more coolant valve actuators 880, one or more contactor actuators 885, one or more battery ejector actuators 890, and one or more drive power sources 238, as shown in FIG. 2B.

The BMS slave 810 comprises a memory 820, a network interface 812 (e.g., a modem, a network card (wireless or wired), an infra-red communication device, etc.), and a processor 814. The processor 814 may be similar, if not identical, to sensor processors 340, controller/microprocessor 520, central processing units (CPUs) 708, and BMS master 830 processor 834. Typically, each drive power source is associated with one BMS slave 810 that monitors sensors (e.g., BMS sensors 860) and may control coolant valve actuator(s) 880, contactor actuator(s) 885, and/or battery ejector actuator(s) 890. In some embodiments, the BMS slave 810 is a subsystem or is incorporated into a drive power source.

The memory 820 may be similar, if not identical, to working memory 736. In some embodiments, the memory 820 may store instructions used by the BMS slave 810 including coolant valve control instructions 822, contactor actuator control instructions 824, battery ejector actuator control instructions 826, and/or other code. The coolant valve control instructions 822 allow a BMS slave 810 to control the coolant value actuator(s) 880 to maintain the drive power source at an optimal temperature and to close coolant valves prior to ejecting a drive power source. The contactor actuator control instructions 824 allow a BMS slave 810 to open and close the contactors to electrically decouple and couple the drive power source to the high voltage rails. The battery ejector actuator control instructions 826 allow a BMS slave 810 to eject a faulty drive power source from vehicle 900, as shown in FIG. 9B. The memory 820 may also include instructions (not shown) for processing sensor information provided by the BMS sensors 860 and to communicate with the BMS master 830. In any event, the memory 820 may be a disk drive, optical storage device, solid-state storage device such as a random access memory (RAM) and/or a read-only memory (ROM), which can be programmable, flash-updateable, and/or the like.

The BMS master 830 comprises a memory 840, a network interface 832 (e.g., a modem, a network card (wireless or wired), an infra-red communication device, etc.), and a processor 834. The processor 834 may be similar, if not identical, to sensor processors 340, controller/microprocessor 520, central processing units (CPUs) 708, and BMS slave 810 processor 814. The BMS master 830 monitors and/or controls the BMS slave(s) 810.

The memory 840 may be similar, if not identical, to working memory 736 and/or 820. In some embodiments, the memory 840 may store instructions used by the BMS master 830 including battery monitor instructions 842, battery balancing instructions 844, battery disconnect instructions 846, and/or other code. The battery monitor instructions 842 allow the BMS master 830 to monitor the status of the drive power source. Monitoring a drive power source may comprise communicating with the BMS slave(s) 810 and/or directly monitoring the BMS sensors 860 to detect power system faults. The battery balancing instructions 844 allow the BMS master 830 in conjunction with the battery balancing system 1050 to balance one or more drive power sources prior to closing the contactors to avoid excessive current flow. The battery disconnect instructions 846 allow the BMS master to electrically disconnect a drive power source from the high voltage rails and may include a command to the BMS slave 810 of the drive power source. The memory 840 may also include instructions (not shown) for processing sensor information provided by the BMS sensors 860 and to communicate with the BMS slave(s) 810. In any event, the memory 840 may be a disk drive, optical storage device, solid-state storage device such as a random access memory (RAM) and/or a read-only memory (ROM), which can be programmable, flash-updateable, and/or the like.

The communication network 850 may be similar, if not identical, to communication network 352. The network interface 812 is used by the BMS slave(s) 810 to communicate over communication network 850, and the network interface 832 is used by the BMS master 830 to communicate over network 850. The network interfaces 812 and 832 may be similar, if not identical, to communication systems 728, as shown in FIG. 7. The BMS slave(s) 810, the BMS master 830, and/or the vehicle high voltage (HV) system 870 control the coolant valve actuators 880, the contactor actuators 885, and the battery ejector actuators 890 via signals or messages through the communication network 850.

Figure 11:
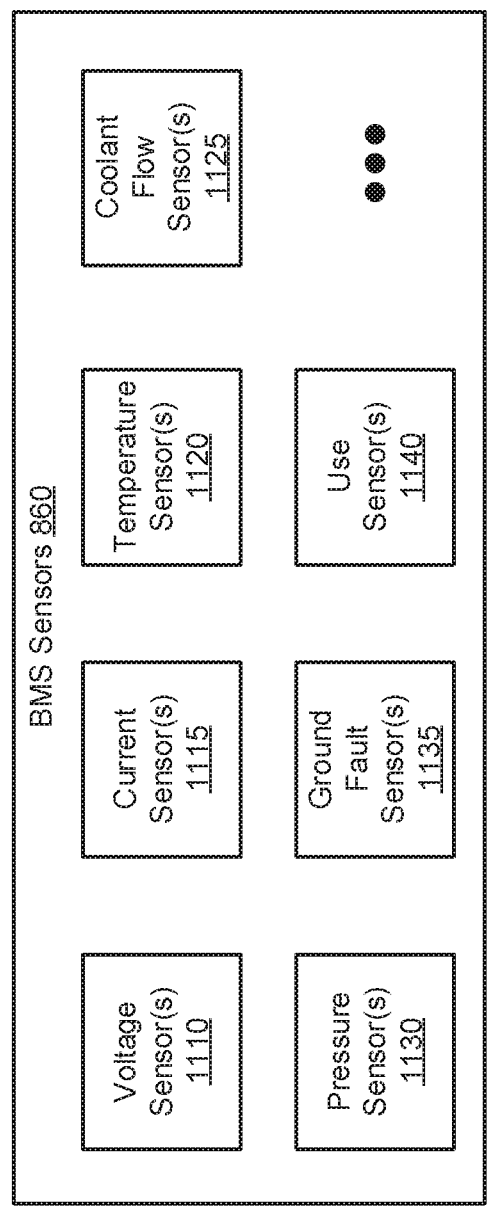
FIG. 11 is a block diagram of an embodiment of battery management system (BMS) sensors associated with a battery management system of a vehicle.

The vehicle high voltage (HV) system 870 monitors the high voltage rails of the vehicle 900. If a power system fault is detected by the vehicle HV system 870, then the fault may be reported to the BMS slave(s) 810 and/or the BMS master 830. In some embodiments, the HV system 870 monitors the ground fault sensor(s) 1135, as shown in FIG. 11. In some embodiments, the vehicle HV system 870 is a subsystem or is incorporated into the BMS master 830.

FIG. 9A illustrates an example vehicle 900 with three ejectable drive power sources 915, 925, 935 in accordance with embodiments of the present disclosure. The vehicle 900 is similar, if not identical, to vehicle 100. The power system of vehicle 900 comprises three drive power sources Battery 1 (915), Battery 2 (925), and Battery 3 (935) that are similar, if not identical, to the power sources 238A, 238B, 238C as described in FIGS. 2B and 8. Vehicle 900 comprises three drive power sources but may comprise one or more drive power sources.

The drive power sources 915, 925, 935 may be any type of battery for storing electrical energy, for example, a lithium ion battery, a lead acid battery, a nickel cadmium battery, etc. Further, the drive power sources 915, 925, 935 may include different types of power storage systems, such as, ionic fluids, hydrogen fuel cells, or other types of fuel cell systems. The drive power sources 915, 925, 935 may also include one or more high-capacity capacitors. The capacitors may be used for long-term or short-term storage of electrical energy. The input into the battery or capacitor may be different from the output, and thus, the battery or capacitor may be charged quickly but drain slowly.

Each drive power source may be associated with a corresponding ejector to eject the drive power source from the vehicle 900 (e.g., Battery 1 (915) and Ejector 1 (910), Battery 2 (925) and Ejector 2 (920), and Battery 3 (935) and Ejector 3 (930), and/or one or more of the drive power sources may be attached without an ejector. Each of the ejectors 910, 920, 930 comprises a battery ejector actuator 890, as shown in FIG. 8. The ejection of the drive power sources 915, 925, 935 may be accomplished using one or more methods including pyrotechnic, spring loaded, compressed gas, robotically actuated, and/or other ejection mechanism. Ejectors 910, 920, 930 may use the same ejection method or may use different ejection methods. After actuation, ejectors 910, 920, 930 may remain attached to vehicle 900, may remain attached to the associated drive power source, or may separate into one or more portions where a portion remains attached to the vehicle 900, a portion remains attached to the associated drive power source, and/or a portion separates from both.

The example vehicle 900 is shown with ejectors 910, 920, 930 coupled between the vehicle 900 and above the drive power sources 915, 925, 935. It should be appreciated that ejectors 910, 920, 930 only require to be positioned to separate the drive power sources 915, 925, 935 from the vehicle 900. For example, FIGS. 14 and 15A-15C illustrate ejectors below the associated drive power source. In some embodiments, an ejector may not be physically coupled to the associated drive power source. For example, a robotically actuated ejector may disconnect a drive power source from the vehicle 900 by removing connectors (e.g., screws, bolts, clamps, and/or the like) and/or cables. The robotically actuated ejector may be configured to disconnect one or more of the drive power sources.

The ejectors 910, 920, 930 may also comprise a mechanism (not shown) to release the drive power source in a location that avoids the vehicle 900 from running over the ejected drive power source. For example, the ejector may comprise an arm or cable, not shown, used to release the drive power source between the drive wheels 250 or outside of the perimeter of the vehicle 900.

In some embodiments, the vehicle 900 comprises one drive power source. The associated ejector may eject the one drive power source while the vehicle 900 is moving to allow vehicle 900 to continue traveling to a safe range. Additionally, or alternatively, the vehicle 900 may be stopped on a hill while ejecting the drive power source and drift downhill to a predetermined safe range.

FIG. 9B illustrates an example vehicle 950 that has an ejected drive power source 915 and two remaining drive power sources 925, and 935 in accordance with embodiments of the present disclosure. The vehicle 950 may be similar, if not identical, to vehicle 100. The vehicle 950 is identical to vehicle 900 with exception of the ejection of Ejector 1 (910) and associated Battery 1 (915), as demonstrated with arrow 960. As described in FIG. 9A, the Ejector 1 (910) may not be ejected or a portion may not be ejected during the ejection of the Battery 1 (915).

In some embodiments, the power system fault requiring ejection of one or more drive power sources may be an electrical disturbance, thermal event, charging error, electric arc, component or system fire, power component or system smoking/smoldering, electrical short, etc., and/or combinations thereof.

The ejectors 910, 920, 930 may also comprise one or more covers (not shown, again for the sake of clarity) that protect the drive power sources 915, 925, 935 from road hazards (e.g., rocks, debris, ejection of another drive power source, and/or the like). The cover may be removed prior to ejection of a drive power source, hinged to temporarily open during ejection, and/or the drive power source may be pushed past the cover by an optional moving mechanism of the ejector.

Figure 10:
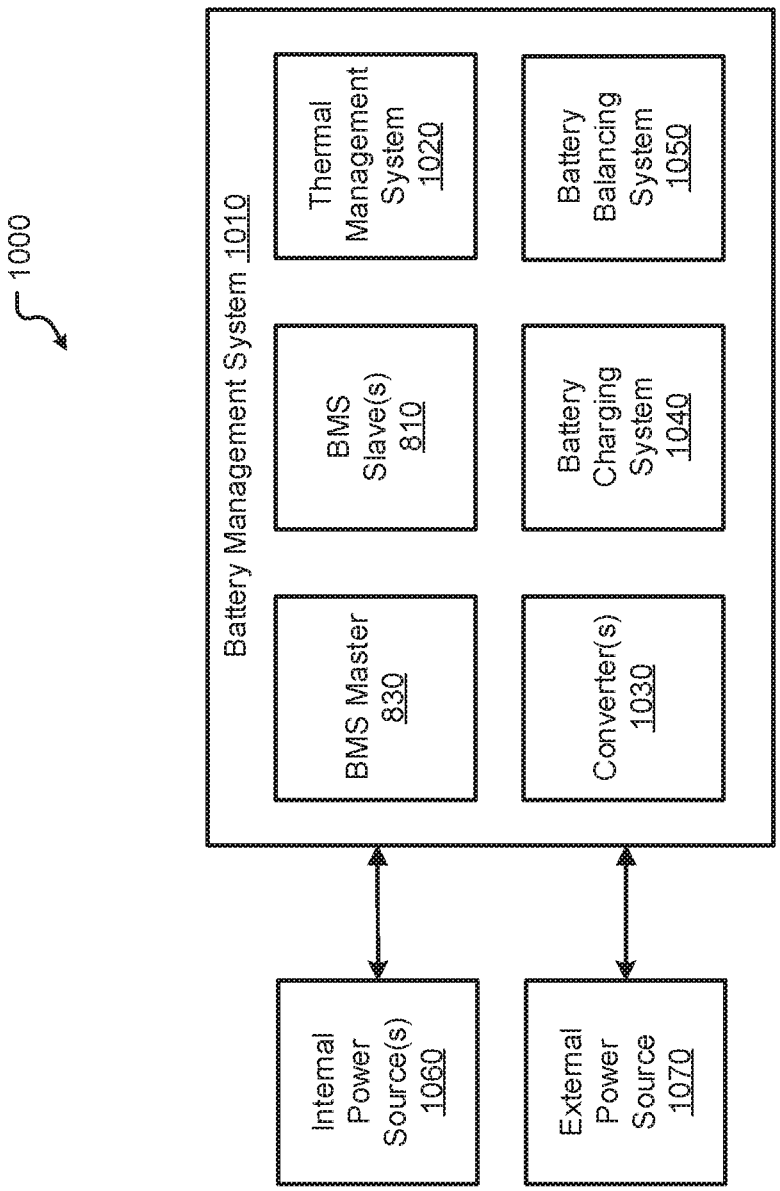
FIG. 10 is a block diagram of an embodiment of a battery management system of a vehicle.

FIG. 10 is a block diagram of an embodiment of a battery management system 1010 of the vehicle 900. The battery management system 1010 comprises BMS slave(s) 810, a BMS master 830, a thermal management system 1020, one or more converters 1030, a battery changing system 1040, and a battery balancing system 1050. The BMS slave(s) 810 and the BMS master 830 are described in greater detail in conjunction with FIG. 8. The battery balancing system 1050 is described in greater detail in conjunction with FIG. 12. As discussed above, the drive power source may be one or more batteries, capacitors, and/or some other electrical storage system. For clarity purposes, the electrical storage system will be described in terms of batteries.

The battery management system 1010 controls and maintains the drive power sources of the vehicle 900, such as drive power sources 915, 925, 935. The BMS master 830 controls the BMS slave(s) 810. Typically, each drive power source is associated with one BMS slave 810 that monitors sensors (e.g., BMS sensors 860) and may control coolant valve actuator(s) 880, contactor actuator(s) 885, and/or battery ejector actuator(s) 890. In some embodiments, a BMS slave 810 is incorporated into a drive power source.

As will be appreciated, the BMS slave(s) 810 can be any electronic system that manages a rechargeable battery (cell or battery pack), such as by protecting the battery from operating outside the battery's safe operating area, monitoring its state, calculating secondary data, reporting that data, controlling its environment, authenticating it and/or balancing it. The BMS slave(s) 810 can be built together with a battery pack and an external communication data bus to form a smart battery pack that can be charged by smart battery charger. The BMS slave(s) 810 can monitor the state of the battery or battery pack by sensing one or more of: voltage: total voltage, voltages of individual cells, minimum and maximum cell voltage or voltage of periodic taps; temperature: average temperature, coolant intake temperature, coolant output temperature, or temperatures of individual cells; state of charge (SOC) or depth of charge (DOD), to indicate the charge level of the battery or individual cells; state of health (SOH), a variously-defined measurement of the remaining capacity of the battery as % of the original capacity; state of power (SOP), the amount of power available for a defined time interval given the current power usage, temperature and other conditions; state of safety (SOS) coolant flow: for air or fluid cooled batteries; and/or current: current in or out of the battery.

Additionally, the BMS slave(s) 810 may calculate values based on the above items, such as maximum charge current as a charge current limit (CCL); maximum discharge current as a discharge current limit (DCL); energy [kWh] delivered since last charge or charge cycle; internal impedance of a cell (to determine open circuit voltage); charge [Ah] delivered or stored (sometimes this feature is called Coulomb counter); total energy delivered since first use; total operating time since first use; and/or total number of cycles. The BMS slave(s) 810 can use the sensed parameters to protect the battery pack by preventing it from operating outside its safe operating area and to maximize the battery pack's capacity, and prevent localized under-charging or overcharging.

The battery balancing system 1050 can actively ensure that all the cells that compose the battery pack and/or multiple battery packs are kept at the same voltage or state of charge, through balancing. The battery balancing system 1050 can balance the cells and/or battery packs by: wasting energy from the most charged cells by connecting them to a load (such as through passive regulators); shuffling energy from the most charged cells to the least charged cells (balancers); reducing the charging current to a sufficiently low level that will not damage fully charged cells, while less charged cells may continue to charge (does not apply to Lithium chemistry cells); and modular charging. In some embodiments, the battery balancing system 1050 is a subsystem or is incorporated into the BMS slave(s) 810.

Figure 13A:
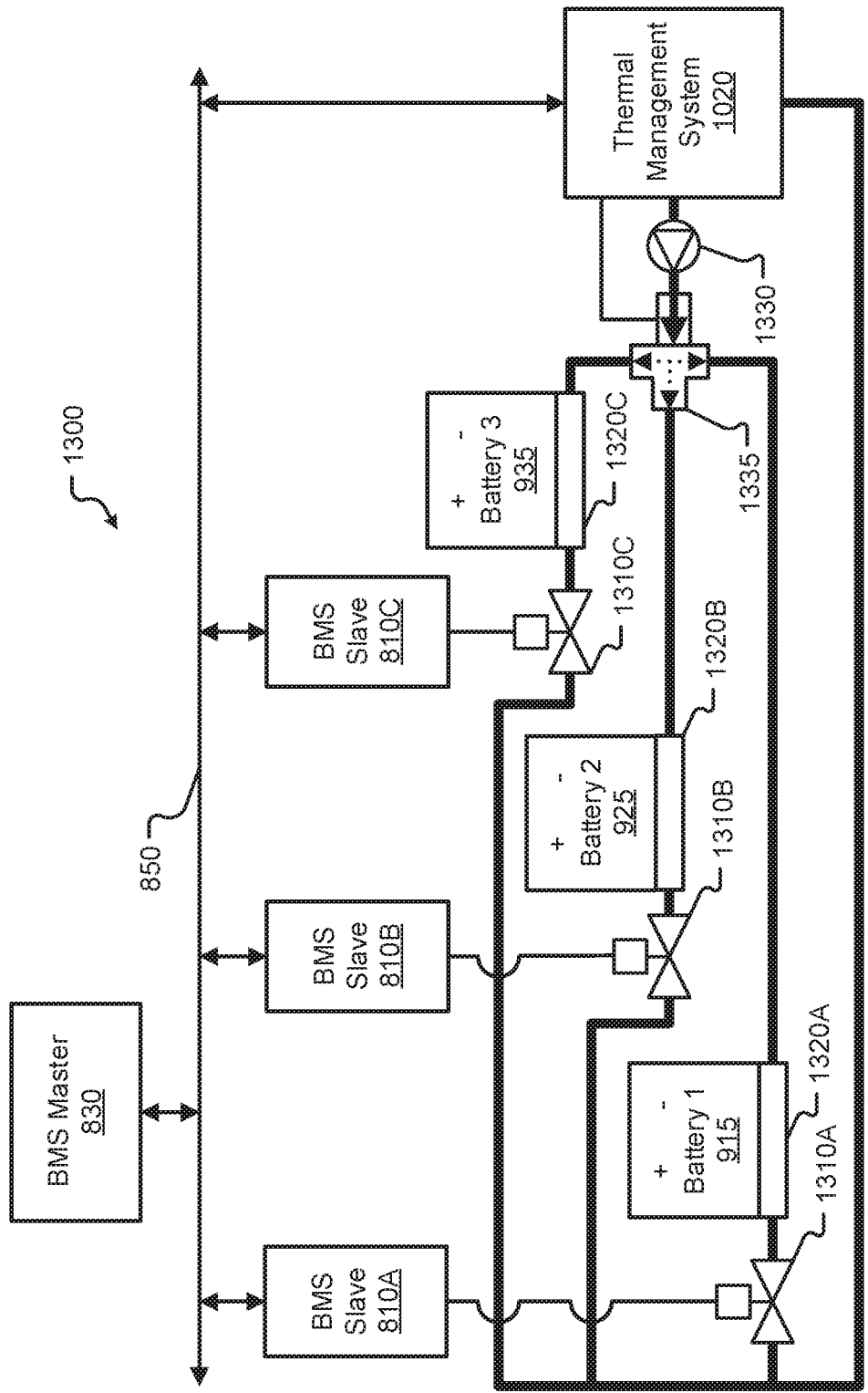
FIG. 13A is a block diagram of an embodiment of a thermal system of a vehicle.
Figure 13B:
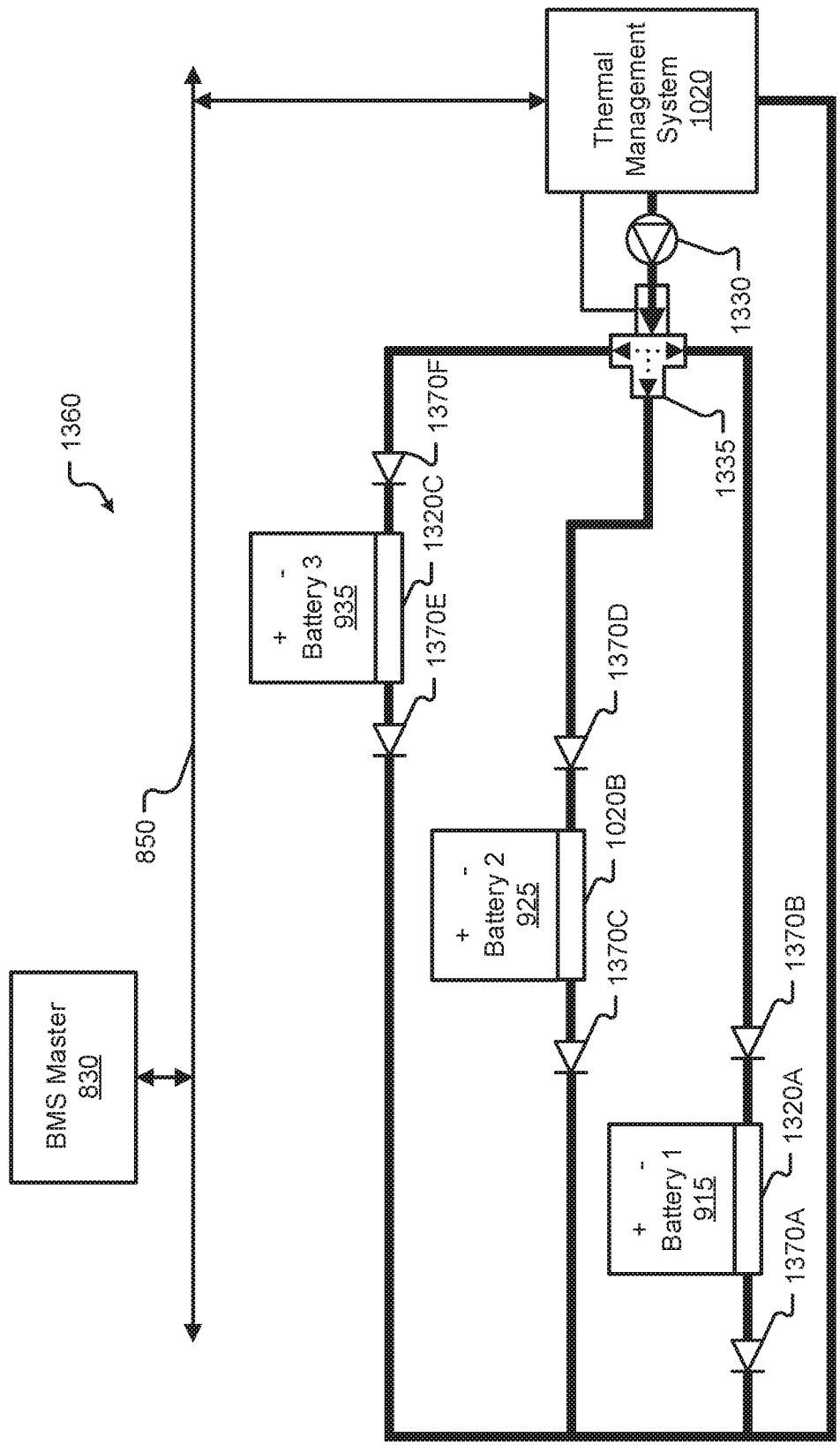
FIG. 13B is a block diagram of another embodiment of a thermal system of a vehicle.

The thermal management system 1020 attempts to maintain the operation of the drive power source within the defined temperature range using a thermal management unit (which typically includes one or more heat exchangers to add heat to or remove heat from a thermal management fluid and a pressurizing source such as a fan or pump) and fluid recycle loop (for the thermal management fluid). Examples of thermal management systems 1020 include one or more of ambient air flow through the drive power source cells, batteries, or modules; pressurized air flow through the drive power source cells, batteries, or modules using a fan; air flow through the drive power source cells, batteries, or modules using a vehicle heater or evaporator core; a pressurized liquid passed through a liquid/ambient air heat exchanger and thereafter passed through the drive power source cells, batteries, or modules; and a pressurized liquid passed through one or more liquid/liquid heat exchangers and thereafter passed through the drive power source cells, batteries or modules. In the latter example, a liquid vehicle engine coolant is used in a first liquid/liquid heat exchanger or electric heater to heat the liquid passed through the drive power source cells, batteries, or modules or an air conditioning refrigerant is used in a second liquid/liquid heat exchanger to cool the liquid passed through the drive power source cells, batteries, or modules. One or more valves, as shown in FIGS. 13A-13B, controlled by coolant valve actuators 880 can direct the liquid through the first or second liquid/liquid heat exchanger depending on whether the drive power source temperature is to be increased or decreased.

The converters 1030 may convert the characteristics of the power from one of the internal power sources 1060 and/or external power sources 1070 into a useable form that may be used either by the drive power sources 915, 925, 935, or one or more loads within the vehicle 900. The electrical converters 1030 may include any electronics or electrical devices and/or component that can change electrical characteristics (e.g., alternating current frequency, amplitude, phase, etc.) associated with the electrical energy provided by the drive power sources 915, 925, 935. The converted electrical energy may then be provided to an optional conditioner (not shown). The conditioner may include any electronics or electrical devices and/or component that may further condition the converted electrical energy by removing harmonics, noise, etc. from the electrical energy to provide a more stable and effective form of power to the vehicle 900.

The functioning of the converters 1030 and charging of the drive power sources 915, 925, 935 may be monitored or managed by the battery charging system 1040. The battery charging system 1040 may include any hardware (e.g., any electronics or electrical devices and/or components), software, or firmware operable to adjust the operations of the converters 1030 or drive power sources 915, 925, 935. The battery charging system 1040 can receive inputs or periodically monitor the converters 1030 and/or drive power sources 915, 925, 935 from this information; the battery charging system 1040 may then adjust settings or inputs into the converters 1030 and/or drive power sources 915, 925, 935 to control the operation of the power storage system that includes the battery management system 1010 and drive power sources 915, 925, 935. In some embodiments, the battery charging system 1040 is a subsystem or is incorporated into the BMS slave(s) 810.

The internal power sources 1060 and/or external power sources 1070 (e.g., a source of power that is external to and/or separate from the vehicle 900, etc.) may provide energy to drive power sources controlled and maintained by the battery management system 1010. Internal power sources 1060 may include a regenerative braking system, a solar array, a power generation unit, and/or the like. An example of an external power source 1070 may include the standard industrial, commercial, or residential power that is provided across power lines. Another example of an external power source 1070 may include a proprietary power system configured to provide power to the vehicle 900 (e.g., an inductive charger).

FIG. 11 is a block diagram of an embodiment of battery management system (BMS) sensors 860 associated with a BMS system 1010 of a vehicle 900. In this example embodiment, the BMS sensors 860 comprise, but are not limited to: voltage sensor(s) 1110, current sensor(s) 1115, temperature sensor(s) 1120, coolant flow sensor(s) 1125, pressure sensor(s) 1130, ground fault sensor(s) 1135, drive power use sensor(s) 1140, and/or the like. The BMS sensors 860 may comprise and/or be supplemented by one or more driving vehicle sensors 304, as shown in FIG. 3A, and one or more interior sensors 337, as shown in FIG. 3B. Additionally, or alternatively, there may be sensors associated with various devices inside the vehicle (e.g., smart phones, tablets, mobile computers, wearables, etc.). Sensor data from one or more of the BMS sensors 860 may be stored in sensor data memory 344.

The BMS sensors 860 that measure charge or discharge current flowing through a drive power source, voltage across drive power source terminals and contactors, temperature of the drive power source, coolant flow used to cool the drive power source, and other drive power source physical conditions. As such, the BMS sensors 860 may include one or many transducers that detect physical phenomena (e.g., temperature, current, voltage, etc.) and convert the detected physical phenomena into an output current, voltage, or similar type of electronic signal (which can be digital or analog).

The voltage sensor(s) 1110 measure voltage across drive power source terminals, across cells of a drive power source, across the high voltage rails, and/or the contactors that electrically coupled the drive power source to the high voltage rails of the vehicle 900. Voltage measurements may be made during charging of the drive power sources, contactor closing/opening, and/or operation of the vehicle 900. Voltage differential measurements may also be made by voltage sensor(s) 1110 and may be needed to measure voltages in a noisy environment.

The current sensor(s) 1115 may measure current used to charge the drive power sources, current drained by loads, and/or leakage currents. The current sensor(s) 1115 may include one or more shunts or shunt circuits that enable the sensing of drive power source currents. The BMS sensors 860 may also include one or more integrated processors (e.g., sensor processor(s) 340) that detect or determine a drive power source's state of charge (SOC).

The temperature sensor(s) 1120 may correspond to one or more thermal transducers that measure a physical temperature at or near a drive power source (or drive power source cell). The temperatures measured by the temperature sensor(s) 1120 may be in Fahrenheit, Celsius, etc. The temperature(s) measured by the temperature sensor(s) 1120 may be reported continuously or periodically without departing from the scope of the present disclosure. Additionally, or alternatively, infrared sensors 309 may be used to measure temperatures.

The coolant flow sensor(s) 1125 may measure the flow of liquid, gases, or other coolant through the drive power sources or coolant pans associated with the drive power sources. The thermal management system 1020 and/or BMS slave(s) 810 may control valves that are opened and closed to control the temperature of the drive power sources. The coolant flow sensor(s) 1125 may be used to detect leakage of coolant into the drive power source by detecting a drop in flow between the amount of coolant flowing into and the amount flowing out of the drive power source. Leakage of coolant (e.g., thermal management fluid) into the drive power source may result in catastrophic failure due to potential short circuits and over temperature conditions requiring ejection of the drive power source.

The pressure sensor(s) 1130 is configured to provide a signal indicative of a change in pressure around a drive power source and/or between cells of a drive power source to detect abnormal pressure gradients. Abnormal pressure gradients may indicate mechanical force applied to the drive power source (e.g., collision, impact with a road hazard, etc.) or expansion of the drive power source due to gases released as a result of a fault. These gases that may be released from a drive power source may be combustible or toxic requiring ejection of the drive power source. The pressure sensor(s) 1130 may be used in conjunction with the oxygen/air sensors 301 to measure ratios and/or types of gasses comprising the air inside the vehicle 900, dangerous gas levels, safe gas levels, smoke, etc.

The ground fault sensor(s) 1135 detects current flow from the high voltage system to the chassis of the vehicle 900. To maintain safety and prevent damage to the vehicle 900, the electrical resistance barrier between the high voltage system and the chassis must be maintained. The Federal Motor Vehicle Safety Specification (FMVSS) 305 requires a minimum isolation resistance barrier of 500 Ω/Volt (i.e., 500 ohms per volt). A short or inadvertent open (e.g., an exposed conductor) in a high voltage system may present a risk of shock or damage to a driver, passenger(s), components of the vehicle 900, and/or other persons or components that may come into contact with a portion of the vehicle 900 that becomes inadvertently charged by a high-voltage source. For example, the vehicle 900 may be involved in a collision with another vehicle or an object. As a result, a high voltage conductor may now be in contact with another portion of the vehicle 900 such that an unintended portion of the vehicle 900 is now electrically connected to the high voltage supply and poses a risk due to shock, fire, overvoltage, etc. to persons and/or property.

The drive power source use sensor(s) 1140, in some embodiments, may correspond to one or more transducers that help determine whether and/or to what extent drive power sources are being used. A use sensor(s) 1140 may help to determine, in a binary fashion, whether a drive power source is currently connected to a load, for example. A use sensor(s) 1140 may also detect when a drive power source is not in use—again in a binary fashion. The use sensor(s) 1140 may also detect which particular loads in the vehicle 900 are currently drawing power from one or more drive power sources. In this way, the use sensor(s) 1140 can help determine the operational loads being placed on drive power sources in addition to determining whether current is simply being drawn from the drive power sources. As can be appreciated, the use sensor(s) 1140 may be incorporated into or nearby loads of the vehicle 900 rather than the drive power sources themselves.

Figure 12:
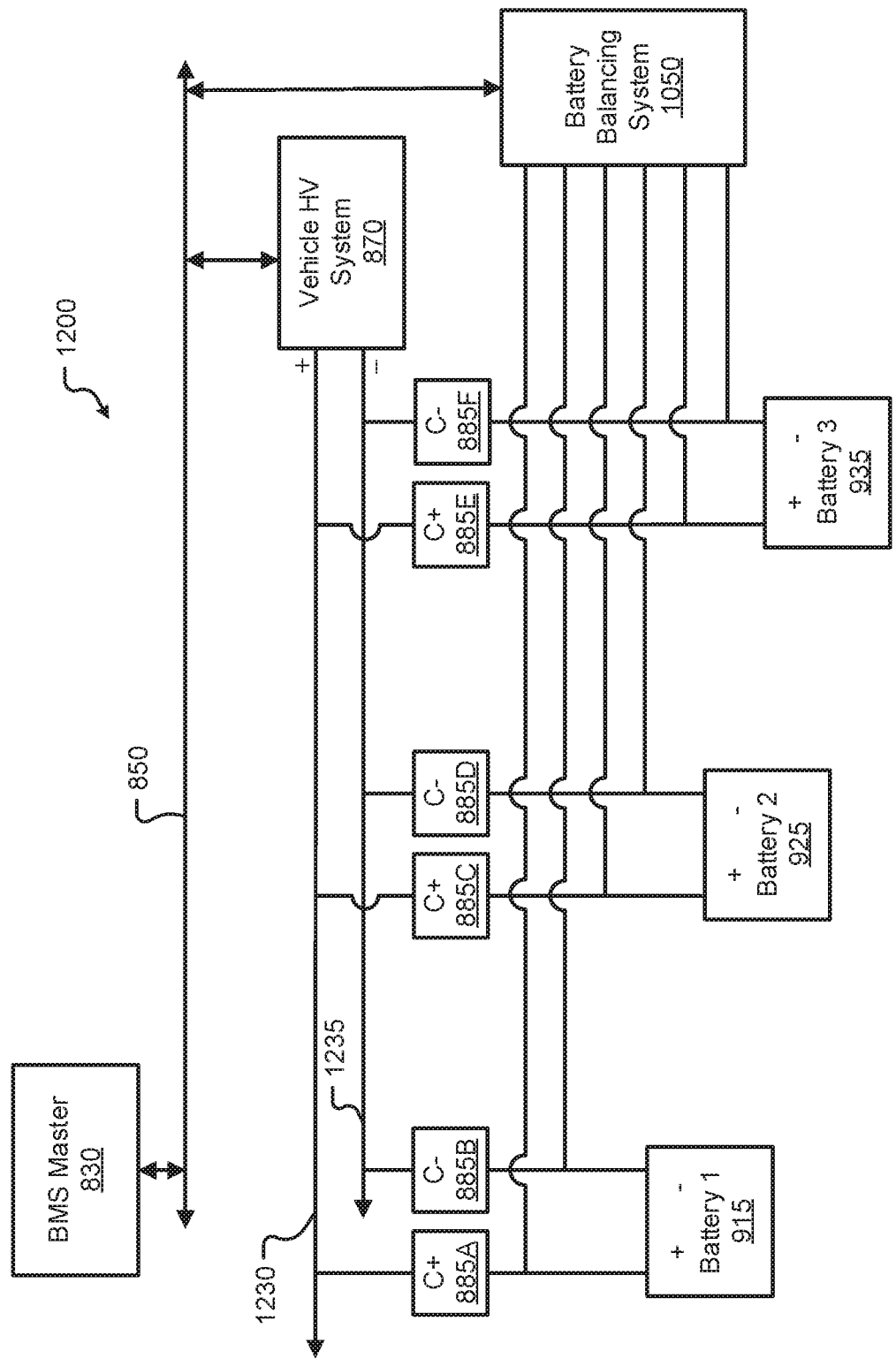
FIG. 12 is a block diagram of an embodiment of a high voltage system associated with a vehicle.

FIG. 12 is a block diagram of an embodiment of a high voltage system 1200 associated with a vehicle 900. The high voltage system 1200 is shown comprising hardware elements that may be electrically and/or communicatively coupled via the communication network 850, including the BMS master 830, the vehicle HV system 870, and the battery balancing system 1050. The electrical energy from the drive power sources 915, 925, 935 is conveyed to loads via a positive (high-voltage) HV rail 1230 and a negative (high-voltage) HV rail 1235 that are monitored by the vehicle HV system 870.

The contactor actuators 885A, 885C, 885E electrically couple drive power source 915, 925, 935, respectively, to the positive HV rail 1230. The contactors actuators 885B, 885D, 885F electrically couple drive power source 915, 925, 935, respectively, to the negative HV rail 1235. As discussed above, the battery balancing instructions 844 allow the BMS master 830 in conjunction with the battery balancing system 1050 to balance one or more drive power sources 915, 925, 935 prior to closing the contactor actuators 885A-885F to avoid excessive current flow. The battery disconnect instructions 846 allow the BMS master 830 to electrically disconnect a drive power source from the high voltage rails and may include a command to the BMS slave 810 of the drive power source.

In some embodiments a protection circuit, not shown, is used to protect one or more drive power sources 915, 925, 935. The protection circuit typically include a thermal fuse (which will permanently shut down the battery pack if its temperature exceeds a predetermined limit), a thermistor (whose resistance varies with temperature as characterized by a Positive Temperature Coefficient (PTC) or a Negative Temperature Coefficient (NTC)), a resettable fuse (which has a similar function to a thermal fuse but after opening it will reset once the fault conditions have been removed and after it has cooled down again to its normal state), a conventional fuse, and/or over-current protection (which is a current sensing device that detects when the upper current limit of the cell, battery, module, or battery pack has been reached and interrupts the circuit).

FIG. 13A is a block diagram of an embodiment of a thermal system 1300 of a vehicle 900. As described above in FIG. 10, the thermal management system 1020 attempts to maintain the operation of the drive power source within the defined temperature range using a thermal management unit (which typically includes one or more heat exchangers to add heat to or remove heat from a thermal management fluid and a pressurizing source such as a fan or pump) and fluid recycle loop (for the thermal management fluid). The valve actuators 1310 are examples of coolant valve actuators 880 that are powered valves. The valve actuators 1370, as shown in FIG. 13B, are examples of non-powered valves (e.g., check valves and/or the like).

In this example embodiment, the BMS slave 810A controls valve actuator 1310A, the BMS slave 810B controls valve actuator 1310B, and the BMS slave 810C controls valve actuator 1310C to control the flow of thermal management fluid through coolant plates 1320A-1320C. The coolant plates 1320A-1320C may be used to cool and/or heat the drive power sources 915, 925, 935 to maintain optimal operating temperatures. The pump 1330 pumps the thermal management fluid through the valve 1335 that circulates the thermal management fluid through the valves 1310 and back to the thermal management system 1020. Portions of the valve 1335 and the valve actuators 1310 may be closed prior to the ejection of one or more drive power source to avoid a change in pressure in the thermal management system 1020.

The command to close portions of the valve 1335 and the valve actuators 1310 may be sent to the BMS slave(s) 810 by the BMS master 830. In some embodiments, the BMS master 830 and/or the thermal management system 1020 control the valve actuators 1310.

FIG. 13B is a block diagram of another embodiment of a thermal system 1360 of a vehicle 900. In this example embodiment, the valve actuators 1370A-1370F are non-powered valves (e.g., check valves and/or the like) that close to prevent backflow of the thermal management fluid after one or more drive power source 915, 925, 935 are ejected. The valve actuators 1370A-1370F perform the same function as valve actuators 1310A-1310C without being controlled.

The coolant pan 1320A for drive power source 915 is isolated by valve actuators 1370A and 1370B. The coolant pan 1320B for drive power source 925 is isolated by valve actuators 1370C and 1370D. The coolant pan 1320C for drive power source 935 is isolated by valve actuators 1370E and 1370F. The pump 1330 pumps the thermal management fluid through the valve 1335 that circulates the thermal management fluid through the valves 1710 and back to the thermal management system 1020. Portions of the valve 1335 may be closed prior to the ejection of one or more drive power source to avoid a change in pressure in the thermal management system 1020.

Figure 14:
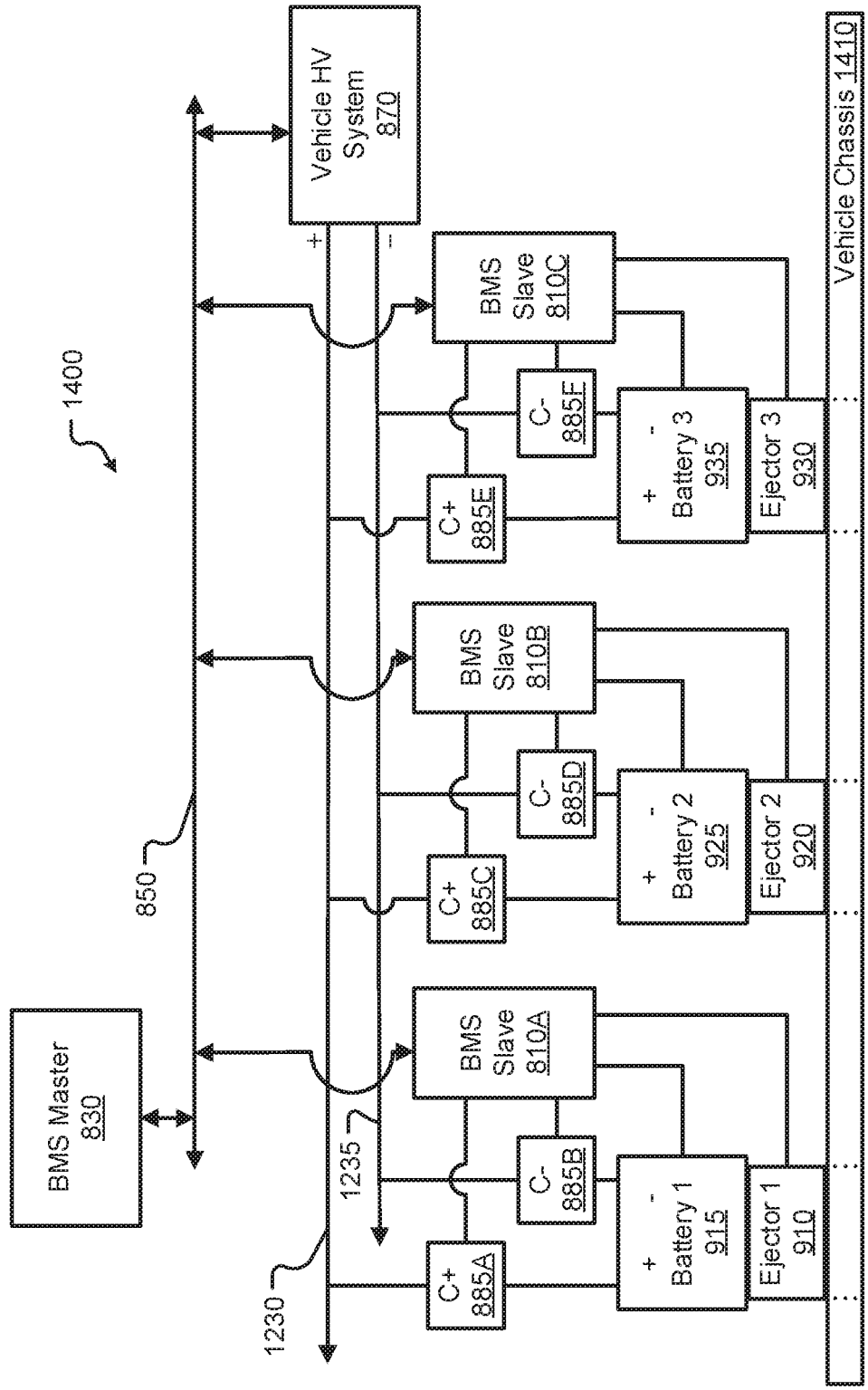
FIG. 14 is a block diagram of an embodiment of a high voltage system with ejectors associated with a vehicle.
Figure 15:
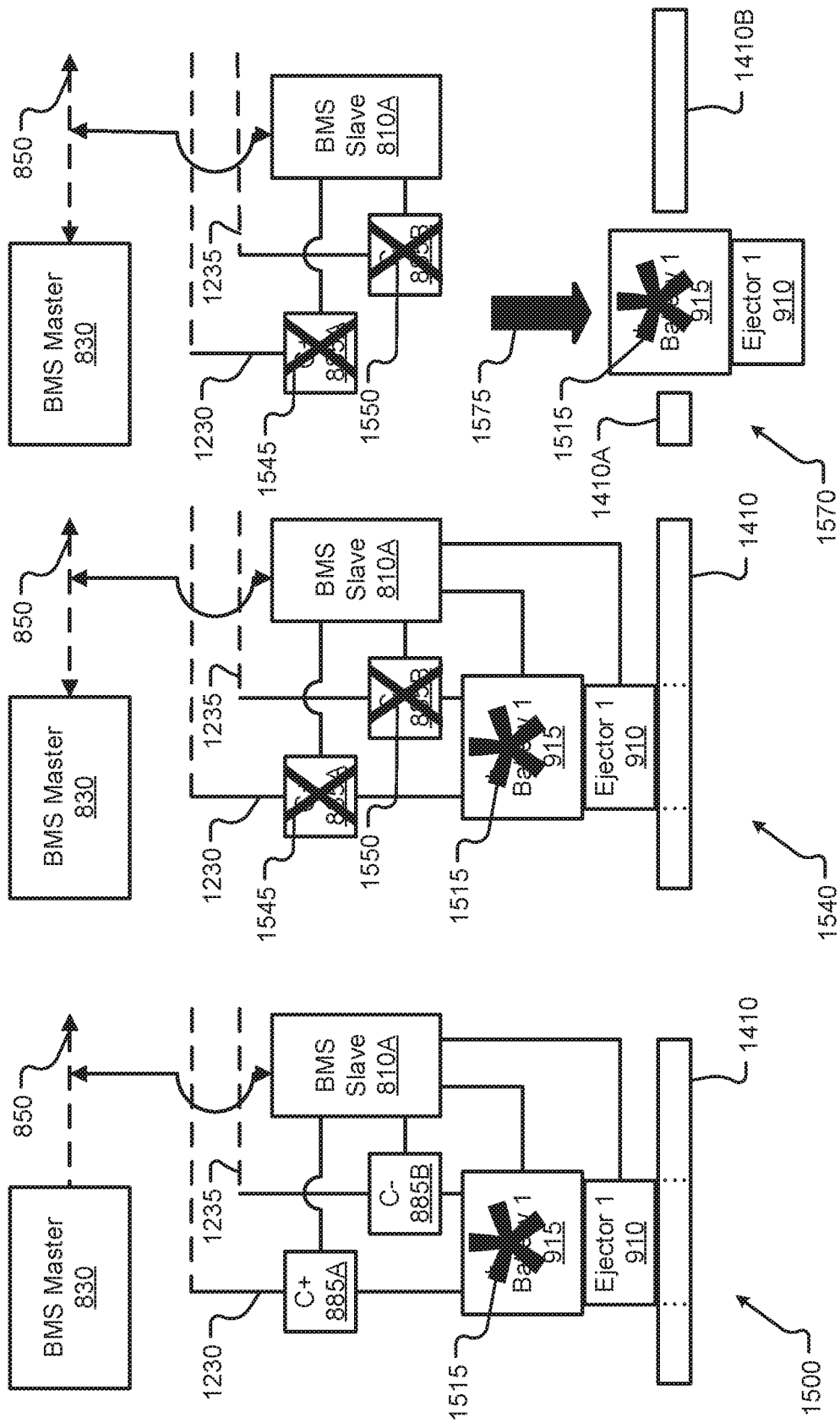
FIG. 15A is a block diagram of an example failure of a drive power source of a high voltage system associated with a vehicle.
FIG. 15B is a block diagram of the example failure of a drive power source of a high voltage system including opening of contactors of a failed drive power source in accordance with at least one embodiment of the present disclosure.
FIG. 15C is a block diagram of the example failure of a drive power source of a high voltage system including ejection of a failed drive power source in accordance with at least one embodiment of the present disclosure.

FIG. 14 is a block diagram of an embodiment of a high voltage system 1400 with ejectors 910, 920, 930 associated with a vehicle 900. The high voltage system 1400 is similar to high voltage system 1200 without showing the battery balancing system 1050 and including the ejectors 910, 920, 930. In this example embodiment, the ejectors 910, 920, 930 are shown attached to vehicle chassis 1410. It should be appreciated that ejectors 910, 920, 930 only require to be positioned to separate the drive power sources 915, 925, 935 from the vehicle 900.

As described above, the ejectors 910, 920, 930 may remain attached to vehicle 900, may remain attached to the associated drive power source, or may separate into one or more portions where a portion remains attached to the vehicle 900, a portion remains attached to the coupled drive power source, and/or a portion separates from both. A portion of the vehicle chassis 1410 may be ejected with the drive power source 915, 925, 935 and/or the ejectors 910, 920, 930 may open a cover (not shown) within the vehicle chassis 1410 to allow the drive power source 915, 925, 935 to exit the vehicle 900.

FIG. 15A is a block diagram of an example failure of a drive power source 915 of a high voltage system 1500 associated with a vehicle 900. The high voltage system 1500 is similar to the high voltage system 1400 after the failure of drive power source 915, as shown by the asterisk 1515. As described above, the BMS master 830 and/or the BMS slave(s) 810 evaluate sensor outputs from BMS sensors 860, as well as interior sensors 337 and/or driving vehicle sensors 304, to determine if there is a catastrophic failure of a drive power source 915 that may injury occupants and/or property, and thus requiring ejection of the drive power source 915.

FIGS. 15A-15C show at a high level the serious of steps required to eject one drive power source. Two or more drive power sources may fail and require ejection from the vehicle 900, as described in flowcharts in FIGS. 16-18. Two or more failed drive power sources may be ejected simultaneously or individually.

FIG. 15B is a block diagram of the example failure of a drive power source 915 of a high voltage system 1540 including opening of contactors 885A and 885B of a failed drive power source 915 in accordance with at least one embodiment of the present disclosure. The high voltage system 1540 is similar to the high voltage system 1500 after the contactor actuators 885A and 885B are opened, as shown by X 1545 and 1550. Opening of contactor actuators 885A and 885B electrically separates the drive power source 915 from the positive HV rail 1230 and the negative HV rail 1235, respectively. The contactor actuators 885A and 885B may be pyrotechnic to physically cut the electrical connections when the contacts of the contactor actuators are fused closed or to avoid fusing the contactor contacts closed.

FIG. 15C is a block diagram of the example failure of a drive power source 915 of a high voltage system 1570 including ejection of the failed drive power source 915 in accordance with at least one embodiment of the present disclosure. The high voltage system 1570 is similar to the high voltage system 1500 and 1540 after the ejector 910 ejects the drive power source 915 as shown by arrow 1575. An opening in the vehicle chassis 1410 is created to allow the ejection of the drive power source 915 as shown by vehicle chassis portions 1410A and 1410B. In this example embodiment, the contactors 885A and 885B, and the BMS slave 810A remain in the vehicle 900. In some embodiments, the contactors 885A and 885B, and/or the BMS slave 810A are ejected along with the drive power source 915.

Figure 16:
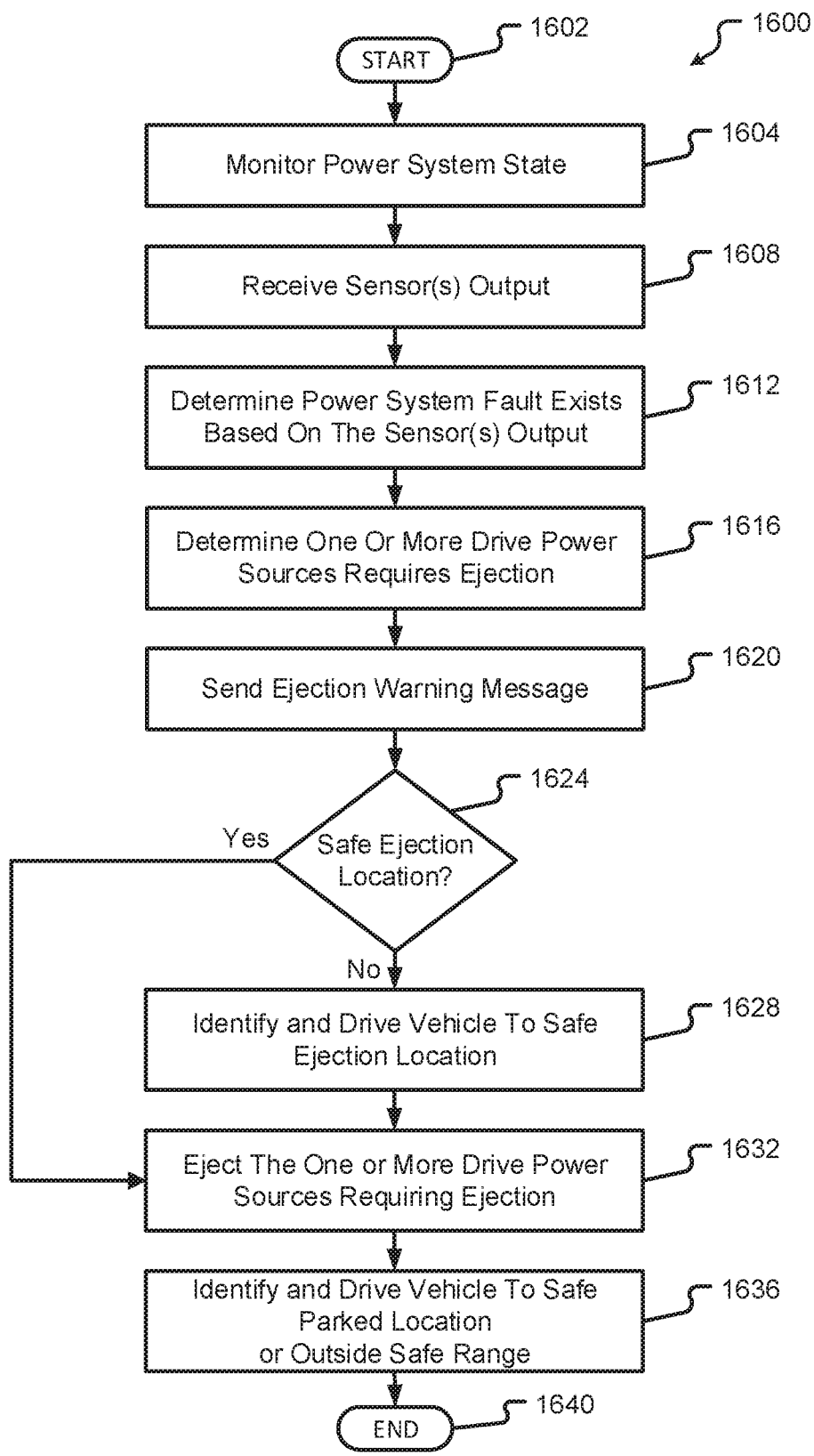
FIG. 16 is a flow diagram of a first method for ejecting a faulty drive power source from a vehicle in accordance with embodiments of the present disclosure.

FIG. 16 is a flow diagram of a first method 1600 for ejecting a faulty drive power source from a vehicle 900 in accordance with embodiments of the present disclosure. While a general order for the steps of the method 1600 is shown in FIG. 16, the method 1600 can include more or fewer steps or can arrange the order of the steps differently than those shown in FIG. 16. The method 1600 begins at start operation 1602. At step 1604, the battery management system 1010 of the vehicle 900 monitors the power system state for faults (e.g., overcurrent, overvoltage, overtemperature, overpressure, etc.). At step 1608, the battery management system 1010 receives output from one or more sensors, including BMS sensors 860. At step 1612, the battery management system 1010 determines that one or more power system faults exists based on the sensor(s) output. The power system fault may correspond to any fault associated with the drive power sources 915, 925, 935. In some embodiments, the power system fault may be an electrical disturbance, thermal event, charging error, electric arc, component or system fire, component or system smoking/smoldering, insulation failure, electrical short, etc., and/or combinations thereof. For the sake of example, the power system fault may be described as corresponding to a thermal event (e.g., fire, smoke, explosion, etc.) associated with the drive power source 915, 925, 935. It should be appreciated, however, that the embodiments described herein are not limited to thermal events associated with the power source 915, 925, 935 of the vehicle 900.

In any event, the method 1600 may detect the power system fault (e.g., thermal event, etc.) based on one or more signals received from thermocouples, pressure sensors, temperature sensors, smoke detectors, electrical continuity circuits, etc., and/or other sensors or devices associated with the vehicle 900 and/or the drive power sources 915, 925, 935. In some embodiments, these sensors or devices may be integral to the drive power sources 915, 925, 935, the vehicle 900, and/or combinations thereof. The sensors or devices, upon detecting a fault condition (e.g., receiving a signal indicative of a pressure, temperature, electrical signal, etc.) of the drive power sources 915, 925, 935 and/or vehicle 900 may report the condition (e.g., in the form of an output, etc.) to the BMS master 830 and/or BMS slave(s) 810 of the vehicle 900. The BMS master 830 and/or BMS slave(s) 810 can interpret the fault condition and determine whether the fault condition falls inside or outside of acceptable parameters. In some embodiments, a system fault may be detected when a value of the fault condition exceeds, or fails to meet, a predetermined threshold value. The predetermined threshold value may be set to include safe operable limits for the power system, the vehicle 900, the occupants of the vehicle 900, the surroundings of the vehicle 900, and/or the like.

At step 1616, the battery management system 1010 determines that one or more drive power sources 915, 925, 935 requires ejections from the vehicle 900. At step 1620, the battery management system 1010 sends an ejection warning message to the driver, occupant(s) of the vehicle 900, and/or a third party (e.g., emergency entity, owner, mechanic, etc.). The person that receives the warning message may be given the opportunity to override the determination that one or more drive power sources require ejections.

The ejection warning may include, but is in no way limited to, an audible alert (e.g., an alarm, siren, tone, etc.), a visual alert (e.g., graphics rendered to a display device, notification message (comprising information regarding the warning) sent to a computational device (e.g., cell phone, tablet computer, laptop or desktop computer, or vehicle display) of a vehicle owner or occupant or otherwise associated with the vehicle, mechanic servicing the vehicle, and the like, flashing lights, strobes, etc.), tactile alerts (e.g., vibrating seats, body panels, etc., of the vehicle 900), and/or combinations thereof. In some embodiments, the ejection warning may include information about the power system fault. For instance, the information may describe the type of power system fault (e.g., thermal event, electrical event, chemical event, etc.), the severity of the power system fault, a location of the power system fault, a time until ejection, and/or the like. In any event, the warnings may be provided to at least one area inside and/or outside of the interior space 150 of the vehicle 900. Additionally, or alternatively, the ejection warning may provide location information for the vehicle 900 in distress. This location information may be in the form of a beacon, radio communication, GPS coordinates, and/or other mapping information. In some embodiments, this location information may allow a responding entity (e.g., police, fire, ambulance, etc.) to reach the vehicle 900 and assist in mitigating or controlling the effect from the power system fault. The responding entity may also retrieve an ejected drive power source.

The type of the power system fault included in the information may indicate whether the fault is a thermal fault (e.g., fire, smoke, explosion, etc.), an electrical fault (e.g., electric arcing, circuit short, circuit open, etc.), a chemical fault (e.g., battery leak, acid leak, gas leak, etc.), and/or some other fault capable of causing a harm to one or more occupants of the vehicle 900, the vehicle 900, and/or objects surrounding the vehicle 900. A severity level associated with the power system fault may selected from a plurality of predetermined severity levels (e.g., a first severity level indicates the power system fault is capable of only damaging the vehicle, a second severity level indicates the power system fault is capable of harming one or more objects other than the vehicle, and a third severity level indicates the power system fault is capable of spreading to a home of the user causing damage.).

Factors that may be considered when determining whether to eject a drive power sources include location of the faulty drive power source, location of the occupants, temperature over a predetermined limit (e.g., over 100 degree Fahrenheit), drive power source venting gasses exceeding a predetermined limit, drive power source is flooded with thermal management fluid, collision detected and drive power source temperature gradient exceeding a predetermined limit, location of the vehicle 900, state of charge exceeding 100%, etc.

Rules for determining when to eject a drive power may also be applied prior to ejecting a drive power source. Ejection rules may include whether to allow vehicle 900 to automatically eject a drive power source, permit ejection while vehicle 900 is moving, permit the vehicle 900 to identify a safe ejection location and/or safe parked location, allow a person to override the ejection decision, length of time period a person has to override the ejection decision, and other rules. These rules may also include the factors considered when determining whether to eject a drive power source and the severity level associated with the power system fault. These rules may be stored in database 618 and/or memory 344, 364, 720, 736, 820, and 840; and be used by the BMS master 830 and/or BMS slave(s) 810.

In test 1624, the battery management system 1010 determines whether the current vehicle location is a safe ejection location or whether the vehicle 900 must be driven to an identified safe ejection location. If test 1624 is NO, then the method 1600 transitions to step 1628. In step 1628, a safe ejection location is identified and the vehicle 900 is driven to the identified safe ejection location. After the vehicle arrives at the safe ejection location, the method 1600 transitions to step 1632. A safe ejection location may be identified by the driver, occupants of the vehicle 900, a third party, locations stored in a database, a location identified by the vehicle 900, etc. If test 1624 is YES, then the method 1600 transitions to step 1632. In step 1632, one or more drive power sources is ejected from the vehicle 900. Ejection of a drive power source may require opening contactors and/or closing coolant valves as described in FIG. 18. In step 1636, a safe parked location or a or a location outside a predetermined safe range from the ejected drive power sources is identified, and the vehicle 900 is driven to the identified safe parked location. A driver may drive, or the vehicle 900 may autonomously drive to the identified safe parked location. After step 1636, the method 1600 ends at end operation 1640.

Figure 17:
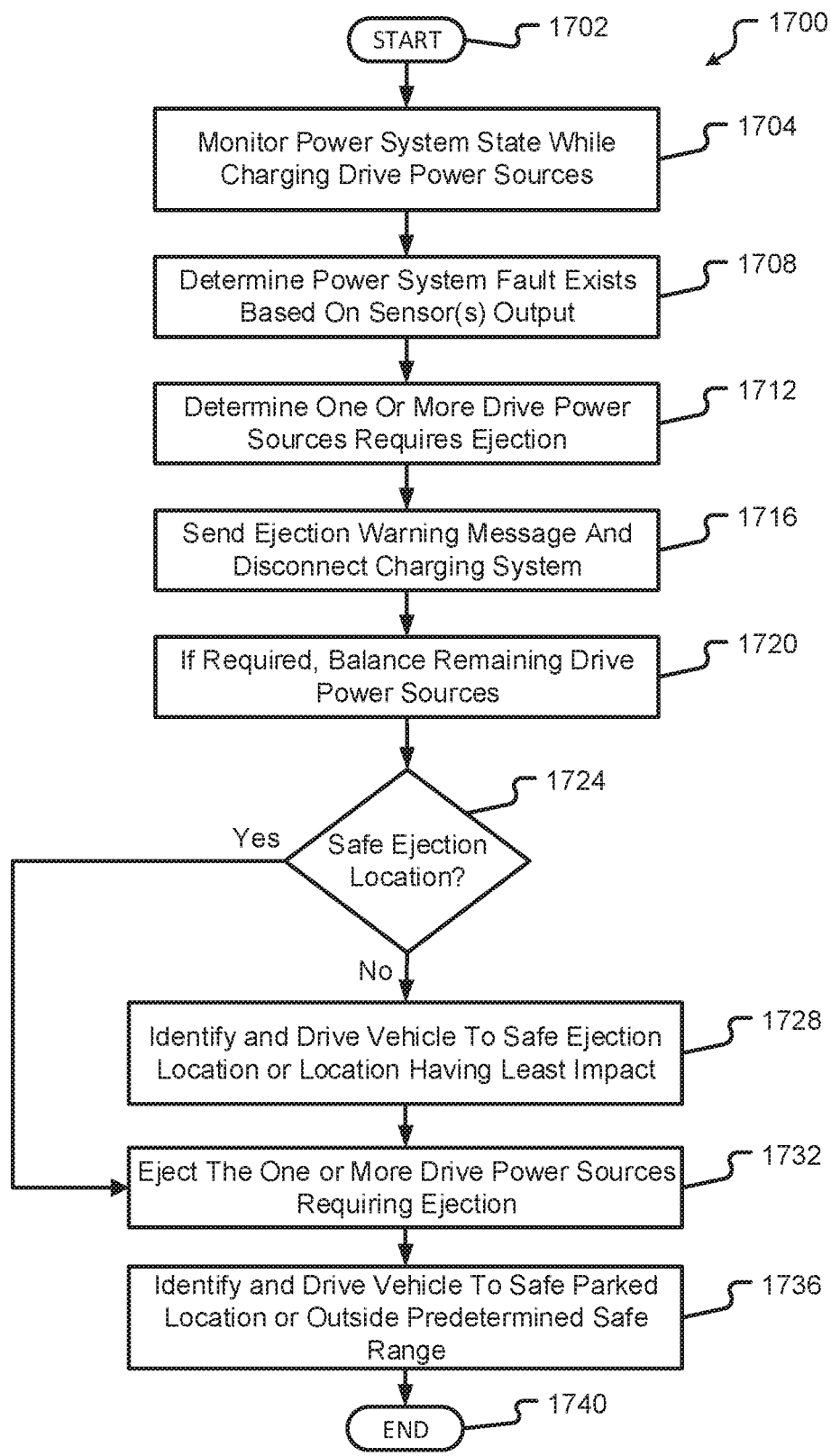
FIG. 17 is a flow diagram of a second method for ejecting a faulty drive power source from a vehicle in accordance with embodiments of the present disclosure.

FIG. 17 is a flow diagram of a second method 1700 for ejecting a faulty drive power source from a vehicle 900 in accordance with embodiments of the present disclosure. In this example, the drive power source(s) of the vehicle 900 are being charged. During charging of the drive power sources, the drive power sources may become unbalanced and require balancing prior to powering the vehicle 900. While a general order for the steps of the method 1700 is shown in FIG. 17, the method 1700 can include more or fewer steps or can arrange the order of the steps differently than those shown in FIG. 17. Additionally, factors that may be considered when determining whether to eject a drive power sources, ejection rules, and types of the power system fault are described in FIG. 16 and apply to FIG. 17.

In some embodiments, the method 1700 may determine that the vehicle 900 is in a connected charging state where the vehicle 900 is receiving power from a power supply, or charging, system (e.g., whether inductively or physically interconnected to the charging system). In one embodiment, the connected charging state may correspond to a state where the vehicle 900 is physically interconnected with a charging system (e.g., via a charging connector and receptacle coupling or interface, etc.). This connection may be determined from one or more charging sensors, charge controllers, proximity sensors, and/or some other switch or sensor associated with the charging receptacle of the vehicle 900 and/or the charging system. For instance, where the one or more switches and/or sensors provide a signal indicating the vehicle 900 is connected to a charging system. In some embodiments, the connection may be determined based on a flow of charge monitored by the charge controller of the vehicle 900. This monitored flow of charge may indicate that the vehicle 900 is receiving charge from a connected charging system.

The method 1700 begins at start operation 1702. At step 1704, the battery management system 1010 of the vehicle 900 monitors the power system state for faults (e.g., overcurrent, overvoltage, overtemperature, overpressure, etc.) while the drive power sources are being charged. At step 1708, the battery management system 1010 receives output from one or more sensors, including BMS sensors 860 and determines that one or more power system faults exists based on the sensor(s) output. At step 1712, the battery management system 1010 determines that one or more drive power sources 915, 925, 935 requires ejections from the vehicle 900. At step 1716, the battery management system 1010 sends an ejection warning message to the driver, occupant(s) of the vehicle 900, and/or a third party. The person that receives the warning message may be given the opportunity to override the determination that one or more drive power sources require ejections. The battery management system 1010 also disconnects the charging system from the vehicle 900. In step 1720, the battery management system 1010 determines whether the remaining drive power sources that are not faulty require balancing. If the remaining power sources require balancing, then the battery management system 1010 may balance the remaining drive power sources, or the vehicle 900 may use one or more drive power sources that do not require balancing to power the vehicle 900. The faulty drive power sources may not require balancing because faulty drive power sources may not be connected to the high voltage rails to power the drivetrain of the vehicle 900.

In test 1724, the battery management system 1010 determines whether the current vehicle location is a safe ejection location or whether the vehicle 900 must be driven to an identified safe ejection location. If test 1724 is NO, then the method 1700 transitions to step 1728. In step 1728, a safe ejection location is identified and the vehicle 900 is driven to the identified safe ejection location, and the method 1700 transitions to step 1732. A safe ejection location may be identified by the driver, occupants of vehicle 900, a third party, locations stored in a database, a location identified by the vehicle 900, etc. If test 1724 is YES, then the method 1700 transitions to step 1732. In step 1732, one or more drive power sources is ejected from the vehicle 900. Ejection of a drive power source may require opening contactors and/or closing coolant valves as described in FIG. 18. In step 1736, a safe parked location or a or a location outside a predetermined safe range is identified, and the vehicle 900 is driven to the identified safe parked location. A driver may drive or the vehicle 900 may autonomously drive to the identified safe parked location. After step 1736, the method 1700 ends at end operation 1740.

Figure 18:
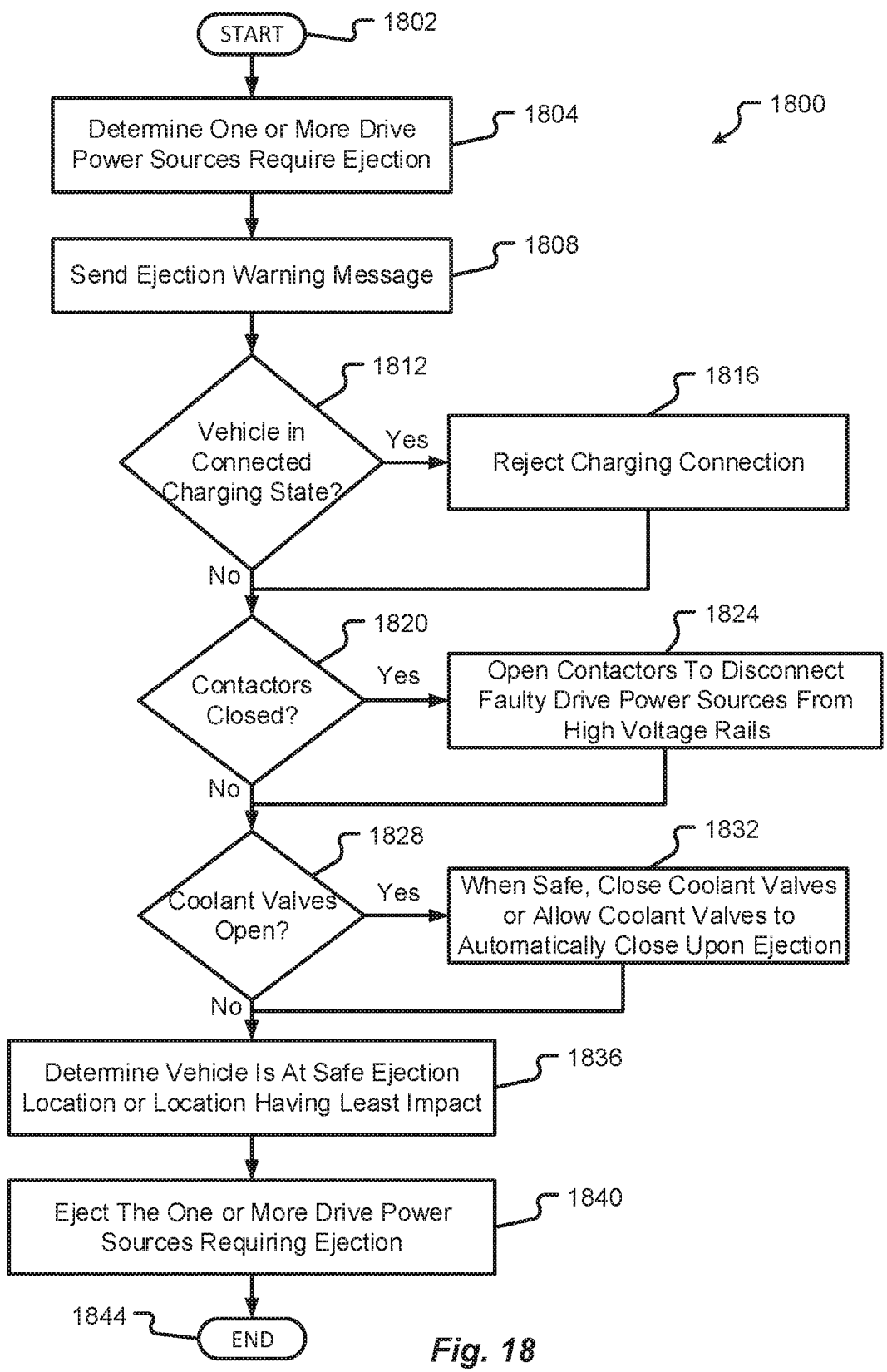
FIG. 18 is a flow diagram of a method for disengaging and ejecting a faulty drive power source from a vehicle in accordance with embodiments of the present disclosure.

FIG. 18 is a flow diagram of a method 1800 for disengaging and ejecting a faulty drive power source from a vehicle 900 in accordance with embodiments of the present disclosure. The method 1800 describes steps for disengaging and ejecting a faulty drive power source that are shown in FIGS. 15A-15C. While a general order for the steps of the method 1800 is shown in FIG. 18, the method 1800 can include more or fewer steps or can arrange the order of the steps differently than those shown in FIG. 18. Additionally, factors that may be considered when determining whether to eject a drive power sources, ejection rules, and types of the power system fault are described in FIG. 16 and apply to FIG. 18.

The method 1800 begins at start operation 1802. At step 1804, the battery management system 1010 of the vehicle 900 while monitoring the power system state for faults (e.g., overcurrent, overvoltage, overtemperature, overpressure, etc.) determines that one or more drive power sources 915, 925, 935 require ejection. The battery management system 1010 receives output from one or more sensors, including BMS sensors 860 to determine that one or more power system faults exists based on the sensor(s) output. At step 1808, the battery management system 1010 sends an ejection warning message to the driver, occupant(s) of the vehicle 900, and/or a third party. The person that receives the warning message may be given the opportunity to override the determination that one or more drive power sources require ejections. At test 1812, the battery management system 1010 determines whether the vehicle 900 is connected to a charger. If test 1812 is YES, then the vehicle 900 rejects the charging connection in step 1816 and method 1800 transitions to test 1820. In some embodiments, rejection of the charging connection may include one or more of interrupting the charging operation (e.g., ceasing the flow of charge from the charging system, etc.), informing the charging system of the fault, disconnecting the charging connection, ejecting the charging connector from the vehicle 900, and/or the like. If the remaining power sources require balancing, then the battery management system 1010 may balance the remaining drive power sources, or the vehicle 900 may use one or more drive power sources that do not require balancing to power the vehicle 900. The faulty drive power sources may not require balancing because faulty drive power sources may not be connected to the high voltage rails to power the vehicle 900.

If test 1812 is NO, the method 1800 transitions to test 1820. At test 1820, the battery management system 1010 determines whether the contactors for the one or more faulty drive power sources are closed thereby electrically coupling the faulty drive power sources to the high voltage rails. If test 1820 is YES, then in step 1824 the contactors for the one or more faulty drive power sources are opened to disconnect the faulty drive power sources from the high voltage rails, and the method 1800 transitions to test 1828. If test 1820 is NO, then the method 1800 transitions to test 1828.

At test 1828, the battery management system 1010 determines whether the coolant valves of the one or more faulty drive power sources are open allowing thermal management fluid to flow into the coolant pan associated with or through the drive power sources. If test 1828 is YES, then method 1800 transitions to step 1832. If the coolant valves are open and the coolant valves do not close automatically, then the battery management system 1010 determines in step 1832 whether it is safe to close the coolant valves. If the vehicle 900 is not located in a safe ejection location and one of the faulty drive power sources is overheating, then the battery management system 1010 may wait until just prior to ejecting the faulty drive power source before closing the coolant valves. After closing the coolant valves, allowing the coolant valves to close automatically, or determining to wait before closing the coolant valves, the method 1800 transitions to step 1836. If test 1828 is NO, then method 1800 transitions to step 1836.

At step 1836, the battery management system 1010 determines that the current vehicle location is a safe ejection location or a location having the least impact to people and/or property. In some embodiments, vehicle 900 is not at a safe ejection location and the vehicle 900 must move to an identified safe ejection location, as described in methods 1600 and 1700. After step 1836, the battery management system 1010 closes any remaining open coolant valves associated with the one or more faulty drive power sources and ejects the one or more faulty drive power sources. The method 1800 ends at end operation 1844.

Figure 19:
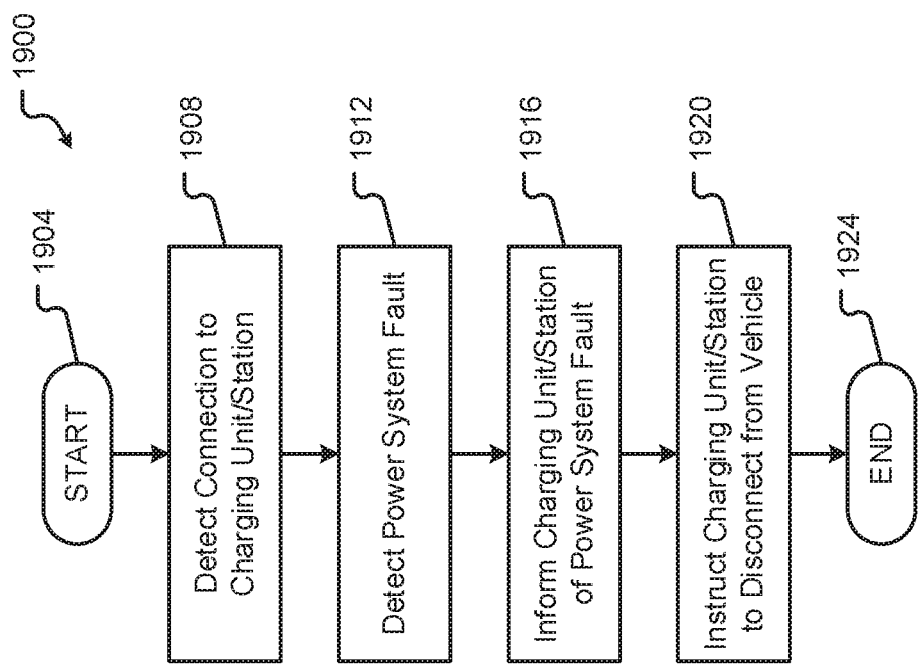
FIG. 19 is a flow diagram of a first method for disconnecting a charging connector from a vehicle in accordance with embodiments of the present disclosure.

FIG. 19 is a flow diagram of a first method for disconnecting a charging connector from a vehicle 900 in accordance with embodiments of the present disclosure. While a general order for the steps of the method 1900 is shown in FIG. 19, the method 1900 can include more or fewer steps or can arrange the order of the steps differently than those shown in FIG. 19. Generally, the method 1900 starts with a start operation 1904 and ends with an end operation 1940. The method 1900 can be executed as a set of computer-executable instructions executed by a computer system and encoded or stored on a computer readable medium. Hereinafter, the method 1900 shall be explained with reference to the systems, components, assemblies, devices, user interfaces, environments, software, etc. described in conjunction with FIGS. 1-18.

The method 1900 begins at step 1904 and proceeds by detecting a connection to a charging unit or station (step 1908). In particular, the method 1900 is directed to physically disconnecting a charging connector from a vehicle 900 via a disconnection device associated with the charging connector. In some embodiments, a charging connection may be detected via one or more proximity sensors or switches detecting a position of connection between the charging connector and a charging receptacle of a vehicle 900. The detection may be made by the vehicle 900 and/or the charging unit/station.

Next, the method 1900 continues by detecting a power system fault (step 1912). In some embodiments, detecting the power system fault may be similar, if not identical, to the detection of the power system fault described at steps 1612 and 1616 in conjunction with FIG. 16.

The method 1900 may proceed by informing the charging unit/station of the detected power system fault (step 1916). This information may be communicated from the communications subsystem 350 of the vehicle 900 to a receiving communications system associated with the charging unit/station. In some embodiments, the information may be communicated in the form of a message sent via a wired communications connection between the charging connector and the charging receptacle. In one embodiment, the information message may be sent to the charging unit/station across a wireless communication network. In some embodiments, the message may include information about the fault as described above.

The method 1900 may proceed by instructing the charging unit/station to disconnect the charging connector from the vehicle 900 (step 1920). In some embodiments, the charging unit/station may respond to this instruction by sending a disconnect signal to at least one ejection or disconnection component and/or mechanism associated with the charging connector and/or charging handle.

Figure 20:
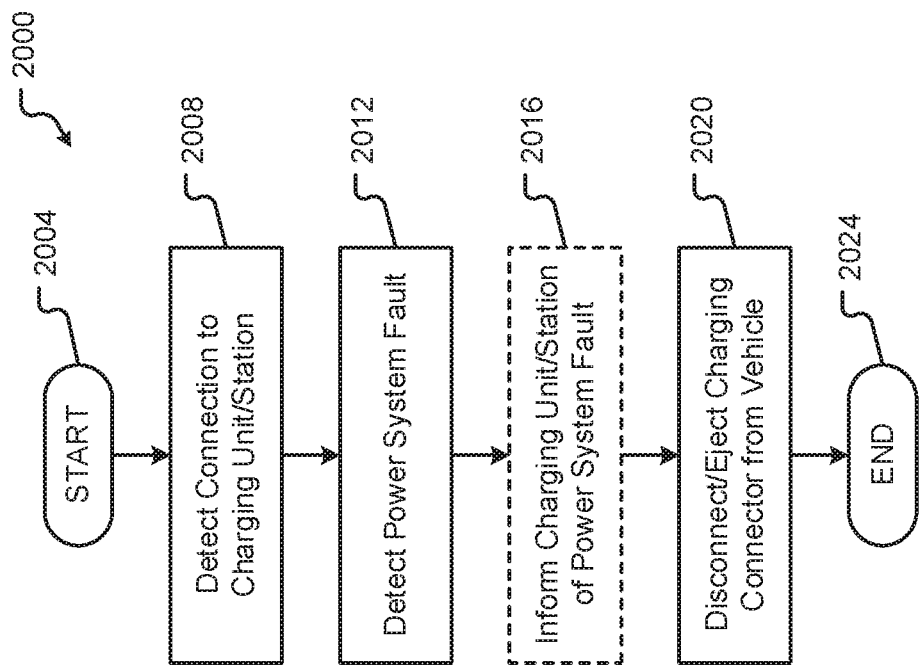
FIG. 20 is a flow diagram of a second method for disconnecting a charging connector from a vehicle in accordance with embodiments of the present disclosure.

FIG. 20 is a flow diagram of a second method for disconnecting a charging connector from a vehicle 900 in accordance with embodiments of the present disclosure. While a general order for the steps of the method 2000 is shown in FIG. 20, the method 2000 can include more or fewer steps or can arrange the order of the steps differently than those shown in FIG. 20. Generally, the method 2000 starts with a start operation 2004 and ends with an end operation 2040. The method 2000 can be executed as a set of computer-executable instructions executed by a computer system and encoded or stored on a computer readable medium. Hereinafter, the method 2000 shall be explained with reference to the systems, components, assemblies, devices, user interfaces, environments, software, etc. described in conjunction with FIGS. 1-19.

The method 2000 begins at step 2004 and proceeds by detecting a connection to a charging unit or station (step 2008). In particular, the method 2000 is directed to physically disconnecting a charging connector from a vehicle 900 via a disconnection device associated with the charging receptacle and/or vehicle 900. In some embodiments, a charging connection may be detected via one or more proximity sensors or switches detecting a position of connection between the charging connector and a charging receptacle of a vehicle 900. The detection may be made by the vehicle 900 and/or the charging unit/station.

Next, the method 2000 continues by detecting a power system fault (step 2012). In some embodiments, detecting the power system fault may be similar, if not identical, to the detection of the power system fault described at steps 1612 and 1616 in conjunction with FIG. 16.

The method 2000 may optionally proceed by informing the charging unit/station of the detected power system fault (step 2016). This information may be communicated from the communications subsystem 350 of the vehicle 900 to a receiving communications system associated with the charging unit/station. In some embodiments, the information may be communicated in the form of a message sent via a wired communications connection between the charging connector and the charging receptacle. In one embodiment, the information message may be sent to the charging unit/station across a wireless communication network. In some embodiments, the message may include information about the fault as described above.

The method 2000 may proceed by instructing a charging connector rejection device to physically disconnect, eject, and/or separate the charging connector from the charging receptacle of the vehicle 900 (step 2020). In some embodiments, the charging connector rejection device may include one or more mechanisms, devices, and/or systems configured to automatically disconnect the charging connector from the charging receptacle.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle control system, comprising: a microprocessor; and a computer readable medium coupled to the microprocessor and comprising instructions stored thereon that cause the microprocessor to: receive output from one or more sensors monitoring a state of a power system in a vehicle while the vehicle is parked; determine, based on at least one output from the one or more sensors exceeding a predetermined threshold value, that the state of the power system includes a power system fault; determine, based on the determined power system fault, that one or more drive power sources of a plurality of drive power sources requires ejection; determine, based on the determination that one or more drive power sources requires ejection, whether a location of the parked vehicle is in a safe ejection location; when the parked location of the vehicle is determined not to be in a safe ejection location, identify a safe ejection location; and eject, in response to the vehicle arriving at the identified safe ejection location, the one or more drive power sources determined to require ejection.

Aspects of the above vehicle control system include wherein the vehicle autonomously drives the vehicle from the parked location to the identified safe ejection location, wherein the vehicle is in a connected charging state with an external charging system at the parked location, wherein a charging connector of the external charging system is physically connected with a charging receptacle of the vehicle in the connected charging state, and the instructions further cause the microprocessor to: eject, prior to autonomously driving the vehicle from the parked location to the identified safe ejection location, the charging connector of the external charging system from the charging receptacle of the vehicle physically separating the vehicle from the external charging system; and autonomously drive the vehicle from the identified safe ejection location to a safe parked location. Aspects of the above vehicle control system include wherein prior to determining whether the one or more drive power sources requires ejection, the instructions further cause the microprocessor to: open contactor actuators of the one or more drive power sources requiring ejection electrically separating the one or more drive power sources from the power system. Aspects of the above vehicle control system include wherein prior to ejecting the one or more drive power sources, the instructions further cause the microprocessor to: close coolant value actuators of the one or more drive power sources requiring ejection physically separating the one or more drive power sources from a coolant system. Aspects of the above vehicle control system include wherein prior to determining whether the parked location of the vehicle is in a safe ejection location, the instructions further cause the microprocessor to: determine a severity level associated with the power system fault from a plurality of predetermined severity levels, wherein a first severity level indicates the power system fault is capable of only damaging the vehicle and a second severity level indicates the power system fault is capable of harming one or more objects other than the vehicle. Aspects of the above vehicle control system include wherein the parked location of the vehicle is determined not to be in a safe ejection location when the severity level is the second severity level and the one or more objects include a structure associated with a user that is in proximity to the vehicle. Aspects of the above vehicle control system include wherein the parked location of the vehicle is determined not to be in a safe ejection location when the severity level is the second severity level and the one or more objects include a structure associated with a user that is in proximity to the vehicle. Aspects of the above vehicle control system include wherein the parked location of the vehicle is determined to be in a safe ejection location when the severity level is the second severity level and the one or more objects are not in proximity to the vehicle. Aspects of the above vehicle control system include wherein the vehicle autonomously drives the vehicle from the parked location to the identified safe ejection location and wherein the instructions further cause the microprocessor to: determine that the user of the vehicle is outside of the vehicle, wherein the user is sleeping and the second severity level indicates a fire resulting from the power system fault is capable of spreading to a home of the user causing damage. Aspects of the above vehicle control system include wherein prior to autonomously driving the vehicle from the parked location to the safe ejection location, the instructions further cause the microprocessor to: refer to a computer readable memory of the vehicle having one or more possible safe ejection locations stored thereon; and identify a safe ejection location from the one or more possible safe ejection locations. Aspects of the above vehicle control system include wherein the vehicle autonomously drives the vehicle from the parked location to the identified safe ejection location and wherein prior to identifying the safe ejection location, the instructions further cause the microprocessor to: determine a range of travel for the vehicle; and filter the one or more possible safe ejection locations to include only those within the range of travel for the vehicle, wherein identifying the safe ejection location includes selecting the safe ejection location from the filtered one or more possible safe ejection locations. Aspects of the above vehicle control system include wherein the safe parked location is any parked location further than a predefined minimum distance from the safe ejection location. Aspects of the above vehicle control system include wherein prior to ejecting the one or more drive power sources requiring ejection instructions further cause the microprocessor to: provide an ejection warning via an output from one or more devices associated with the vehicle, wherein the ejection warning is configured to notify one or more people of the ejection. Aspects of the above vehicle control system include wherein the ejection warning includes information about the power system fault. Aspects of the above vehicle control system include wherein the one or more people override determining that one or more drive power sources of a plurality of drive power sources require ejection.

Embodiments include a method, comprising: receiving, via a processor, output from one or more sensors monitoring a state of a power system in a vehicle while the vehicle is in a connected charging state in which the power system is in electrical communication with an external charging system, wherein the vehicle is a charging location and wherein, when the vehicle is in the connected charging state, a charging connector of the external charging system is physically connected with a charging receptacle of the vehicle; determining, via the processor and based on at least one output from the one or more sensors exceeding a predetermined threshold value, that the state of the power system includes a power system fault; determining, in response to determining the power system fault, that one or more drive power sources of a plurality of drive power sources require ejection; determining, via the processor, that a user of the vehicle is outside of the vehicle; ejecting, in response to determining that the state of the power system includes the power system fault, the charging connector of the external charging system from the charging receptacle of the vehicle to physically disconnect the vehicle from the external charging system; determining, via the processor, whether a current charging location of the vehicle is in a safe ejection location; and ejecting, in response to the vehicle arriving at the identified safe ejection location, the one or more drive power sources determined to require ejection.

Aspects of the above method include wherein prior to determining whether the parked location of the vehicle is in a safe ejection location, the method further comprises: determining, via the processor, a severity level associated with the power system fault from a plurality of predetermined severity levels, wherein a first severity level indicates the power system fault is capable of only damaging the vehicle and a second severity level indicates the power system fault is capable of harming one or more objects other than the vehicle. Aspects of the above method include wherein the parked location of the vehicle is determined not to be in a safe ejection location when the severity level is the second severity level and the one or more objects include a structure associated with the user that is in proximity to the vehicle. Aspects of the above method include wherein further comprising: in response to determining that the current charging location is not a safe ejection location, autonomously driving the vehicle from the charging location to an identified safe ejection location and prior to autonomously driving the vehicle from the parked location to the identified safe ejection location: determining, via the processor, that two or more drive power sources of the plurality of drive power sources require balancing; and balancing the two or more drive power sources of the plurality of drive power sources requiring balancing.

Embodiments include a vehicle, comprising: a power system comprising a plurality of drive power sources; at least one sensor associated with the power system, wherein the at least one sensor is configured to monitor a state of the power system while charging; a location module configured to determine a geographical location of the vehicle; a microprocessor; and a computer readable medium coupled to the microprocessor and comprising instructions stored thereon that cause the microprocessor to: receive output from the at least one sensor associated with the power system while the vehicle is in a connected charging state in which a charging connector of an external charging system is physically connected with a charging receptacle of the vehicle; determine, based on at least one output from the at least one sensor exceeding a predetermined threshold value, that the state of the power system includes a power system fault; eject, in response to determining that the state of the power system includes the power system fault, the charging connector of the external charging system from the charging receptacle of the vehicle to physically separate the vehicle from the external charging system; determine, based on the determined power system fault, that one or more drive power sources of a plurality of drive power sources requires ejection; and eject the one or more drive power sources determined to require ejection.

Aspects of the above vehicle include the instructions of the vehicle control system further cause the microprocessor to: determine, based on the determination that one or more of the drive power sources requires ejection, whether a current parked location of the vehicle is in a safe ejection location; when the parked location of the vehicle is determined not to be in a safe ejection location, receive a command to operate one or more vehicle components to cause the vehicle to move from the parked location to an identified safe ejection location, wherein the one or more of the plurality of drive power sources is ejected, in response to the vehicle being located at the identified safe ejection location; and move the vehicle from the identified safe ejection location to a safe parked location or outside a predetermined safe range from the identified safe ejection location.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles2

What is claimed is:

1. A vehicle control system, comprising:
   a microprocessor; and
   a computer readable medium coupled to the microprocessor and comprising instructions stored thereon that cause the microprocessor to:
   receive output from one or more sensors monitoring a state of a power system in a vehicle while the vehicle is parked;
   determine, based on at least one output from the one or more sensors exceeding a predetermined threshold value, that the state of the power system includes a power system fault;
   determine, based on the determination that the state of the power system includes a power system fault, that one or more drive power sources of a plurality of drive power sources requires ejection;
   determine, based on the determination that one or more drive power sources of the plurality of drive power sources requires ejection, whether a location of the parked vehicle is in a safe ejection location;
   when the location of the parked vehicle is determined not to be in a safe ejection location, identify a safe ejection location; and
   eject, in response to the vehicle arriving at the identified safe ejection location, the one or more drive power sources determined to require ejection.

2. The vehicle control system of claim 1, wherein the vehicle autonomously drives the vehicle from the parked location to the identified safe ejection location, wherein the vehicle is in a connected charging state with an external charging system at the parked location, wherein a charging connector of the external charging system is physically connected with a charging receptacle of the vehicle in the connected charging state, and the instructions further cause the microprocessor to:
   eject, prior to autonomously driving the vehicle from the parked location to the identified safe ejection location, the charging connector of the external charging system from the charging receptacle of the vehicle physically separating the vehicle from the external charging system; and
   autonomously drive the vehicle from the identified safe ejection location to a safe parked location.

3. The vehicle control system of claim 2, wherein the safe parked location is any parked location further than a predefined minimum distance from the safe ejection location.

4. The vehicle control system of claim 1, wherein prior to determining whether the one or more drive power sources requires ejection, the instructions further cause the microprocessor to:
   open contactor actuators of the one or more drive power sources of the plurality of drive power sources requiring ejection electrically separating the one or more drive power sources from the power system.

5. The vehicle control system of claim 4, wherein prior to ejecting the one or more drive power sources, the instructions further cause the microprocessor to:
   close coolant value actuators of the one or more drive power sources of the plurality of drive power sources requiring ejection physically separating the one or more drive power sources from a coolant system.

6. The vehicle control system of claim 1, wherein prior to determining whether the parked location of the vehicle is in a safe ejection location, the instructions further cause the microprocessor to:
   determine a severity level associated with the power system fault from a plurality of predetermined severity levels, wherein a first severity level indicates the power system fault is capable of only damaging the vehicle and a second severity level indicates the power system fault is capable of harming one or more objects other than the vehicle.

7. The vehicle control system of claim 6, wherein the parked location of the vehicle is determined not to be in a safe ejection location when the severity level is the second severity level and the one or more objects include a structure associated with a user of the vehicle that is in proximity to the vehicle.

8. The vehicle control system of claim 6, wherein the parked location of the vehicle is determined to be in a safe ejection location when the severity level is the second severity level and the one or more objects are not in proximity to the vehicle.

9. The vehicle control system of claim 7, wherein the vehicle autonomously drives the vehicle from the parked location to the identified safe ejection location and wherein the instructions further cause the microprocessor to:
   determine that the user of the vehicle is outside of the vehicle, wherein the user is sleeping and the second severity level indicates a fire resulting from the power system fault is capable of spreading to a home of the user causing damage.

10. The vehicle control system of claim 6, wherein the vehicle autonomously drives the vehicle from the parked location to the identified safe ejection location and wherein prior to autonomously driving the vehicle from the parked location to the safe ejection location, the instructions further cause the microprocessor to:
    refer to a computer readable memory of the vehicle having one or more possible safe ejection locations stored thereon; and
    identify a safe ejection location from the one or more possible safe ejection locations.

11. The vehicle control system of claim 10, wherein prior to identifying the safe ejection location, the instructions further cause the microprocessor to:
    determine a range of travel for the vehicle; and
    filter the one or more possible safe ejection locations to include only those within the range of travel for the vehicle, wherein identifying the safe ejection location includes selecting the safe ejection location from the filtered one or more possible safe ejection locations.

12. The vehicle control system of claim 1, wherein prior to ejecting the one or more drive power sources of the plurality of drive power sources requiring ejection instructions further cause the microprocessor to:
    provide an ejection warning via an output from one or more devices associated with the vehicle, wherein the ejection warning is configured to notify one or more people of the ejection.

13. The vehicle control system of claim 12, wherein the ejection warning includes information about the power system fault.

14. The vehicle control system of claim 13, wherein the one or more people override determining that one or more drive power sources of a plurality of drive power sources require ejection.

15. A method, comprising:
    receiving, via a processor, output from one or more sensors monitoring a state of a power system in a vehicle while the vehicle is in a connected charging state in which the power system is in electrical communication with an external charging system, wherein the vehicle is a charging location and wherein, when the vehicle is in the connected charging state, a charging connector of the external charging system is physically connected with a charging receptacle of the vehicle;
    determining, via the processor and based on at least one output from the one or more sensors exceeding a predetermined threshold value, that the state of the power system includes a power system fault;
    determining, in response to determining that the state of the power system includes the power system fault, that one or more drive power sources of a plurality of drive power sources require ejection;
    determining, via the processor, that a user of the vehicle is outside of the vehicle;
    ejecting, in response to determining that the state of the power system includes the power system fault, the charging connector of the external charging system from the charging receptacle of the vehicle to physically disconnect the vehicle from the external charging system;
    determining, via the processor, whether a current charging location of the vehicle is in a safe ejection location; and
    ejecting, in response to the vehicle arriving at an identified safe ejection location, the one or more drive power sources of the plurality of drive power sources determined to require ejection.

16. The method of claim 15, wherein prior to determining whether a parked location of the vehicle is in a safe ejection location, the method further comprises:
    determining, via the processor, a severity level associated with the power system fault from a plurality of predetermined severity levels, wherein a first severity level indicates the power system fault is capable of only damaging the vehicle and a second severity level indicates the power system fault is capable of harming one or more objects other than the vehicle.

17. The method of claim 16, wherein the parked location of the vehicle is determined not to be in a safe ejection location when the severity level is the second severity level and the one or more objects include a structure associated with the user that is in proximity to the vehicle.

18. The method of claim 16, further comprising:
    in response to determining that the current charging location is not a safe ejection location, autonomously driving the vehicle from the charging location to an identified safe ejection location and wherein prior to autonomously driving the vehicle from the parked location to the identified safe ejection location:

determining, via the processor, that two or more drive power sources of the plurality of drive power sources require balancing; and balancing the two or more drive power sources of the plurality of drive power sources requiring balancing.

19. A vehicle, comprising:

a power system comprising a plurality of drive power sources;

at least one sensor associated with the power system, wherein the at least one sensor is configured to monitor a state of the power system while charging;

a location module configured to determine a geographical location of the vehicle;

a microprocessor; and a computer readable medium coupled to the microprocessor and comprising instructions stored thereon that cause the microprocessor to:

receive output from the at least one sensor associated with the power system while the vehicle is in a connected charging state in which a charging connector of an external charging system is physically connected with a charging receptacle of the vehicle;

determine, based on at least one output from the at least one sensor exceeding a predetermined threshold value, that the state of the power system includes a power system fault;

eject, in response to determining that the state of the power system includes the power system fault, the charging connector of the external charging system from the charging receptacle of the vehicle to physically separate the vehicle from the external charging system;

determine, based on the determination that the state of the power system includes a power system fault, that one or more drive power sources of a plurality of drive power sources requires ejection; and eject the one or more drive power sources of the plurality of drive power sources determined to require ejection.

20. The vehicle of claim 19, wherein the instructions further cause the microprocessor to:

determine, based on the determination that one or more of the drive power sources of the plurality of drive power sources requires ejection, whether a current parked location of the vehicle is in a safe ejection location;

when the current parked location of the vehicle is determined not to be in a safe ejection location, receive a command to operate one or more vehicle components to cause the vehicle to move from the current parked location to an identified safe ejection location, wherein the one or more of the plurality of drive power sources is ejected, in response to the vehicle being located at the identified safe ejection location; and move the vehicle from the identified safe ejection location to a safe parked location or outside a predetermined safe range from the identified safe ejection location.

\* \* \* \* \*